(12) United States Patent
McCormick

(10) Patent No.: US 11,873,692 B2
(45) Date of Patent: *Jan. 16, 2024

(54) SENSOR TRANSPORTATION APPARATUS FOR A WIRELINE LOGGING TOOL STRING

(71) Applicant: PETROMAC IP LIMITED, Auckland (NZ)

(72) Inventor: Stephen Peter McCormick, Auckland (NZ)

(73) Assignee: PETROMAC IP LIMITED, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,694

(22) Filed: Jun. 7, 2022

(65) Prior Publication Data

US 2022/0298879 A1    Sep. 22, 2022

Related U.S. Application Data

(63) Continuation of application No. 16/801,901, filed on Feb. 26, 2020, now Pat. No. 11,371,306, which is a
(Continued)

(30) Foreign Application Priority Data

| Nov. 16, 2012 | (NZ) | ......................................... | 603660 |
| Nov. 16, 2012 | (NZ) | ......................................... | 603662 |
| Aug. 6, 2013 | (NZ) | ......................................... | 613986 |

(51) Int. Cl.
*E21B 23/14* (2006.01)
*E21B 47/01* (2012.01)
(Continued)

(52) U.S. Cl.
CPC .............. *E21B 23/14* (2013.01); *E21B 17/10* (2013.01); *E21B 17/1042* (2013.01);
(Continued)

(58) Field of Classification Search
CPC ...... E21B 23/14; E21B 17/10; E21B 17/1042; E21B 17/1057; E21B 47/00; E21B 47/01;
(Continued)

(56) References Cited

U.S. PATENT DOCUMENTS

| 684,732 A | 10/1901 | Villard |
| 2,931,440 A | 4/1960 | Lebourg |

(Continued)

FOREIGN PATENT DOCUMENTS

| CN | 1605709 A | 4/2005 |
| CN | 2864066 Y | 1/2007 |

(Continued)

OTHER PUBLICATIONS

Marwaha, Sachin, International Search Report of the International Search Authority, dated Mar. 19, 2014, 7 pages, PCT/NZ2013/000210, PCT/ISA Australian Patent Office.
(Continued)

*Primary Examiner* — Brad Harcourt
(74) *Attorney, Agent, or Firm* — Dann, Dorfman, Herrell and Skillman, P.C.

(57) ABSTRACT

The disclosure relates to a sensor transportation apparatus to convey an elongate sensor assembly through a wellbore. The sensor transportation apparatus comprises at least one engagement structure to connect the sensor transportation apparatus to the sensor assembly, and a pair of wheels arranged to rotate about an axis of rotation substantially perpendicular to a longitudinal axis of the sensor assembly when the transportation apparatus is connected to the sensor assembly, and an orientation structure comprising at least one orientation projection, in a transverse outline of the sensor transportation apparatus a said orientation projection extending between the pair of wheels so that the shortest distance between a centre of mass of the elongate sensor
(Continued)

assembly and the wellbore wall is when the pair of wheels are in contact with the wellbore wall.

16 Claims, 36 Drawing Sheets

Related U.S. Application Data continuation-in-part of application No. 16/027,113, filed on Jul. 3, 2018, now Pat. No. 10,612,333, which is a continuation-in-part of application No. 15/825,074, filed on Nov. 28, 2017, now Pat. No. 10,364,627, which is a continuation of application No. 14/441,833, filed as application No. PCT/NZ2013/000210 on Nov. 15, 2013, now Pat. No. 9,863,198.

(51) Int. Cl.
*E21B 17/10* (2006.01)
*F16N 9/04* (2006.01)
*F16N 17/00* (2006.01)
*E21B 47/00* (2012.01)
*F16N 11/10* (2006.01)
*F16N 13/00* (2006.01)
*E21B 23/00* (2006.01)

(52) U.S. Cl.
CPC .......... *E21B 17/1057* (2013.01); *E21B 47/00* (2013.01); *E21B 47/01* (2013.01); *F16N 9/04* (2013.01); *F16N 17/00* (2013.01); *E21B 23/001* (2020.05); *F16N 11/10* (2013.01); *F16N 2013/003* (2013.01)

(58) Field of Classification Search
CPC .......... E21B 23/001; F16N 9/04; F16N 17/00; F16N 11/10; F16N 2013/003
See application file for complete search history.

(56) References Cited

U.S. PATENT DOCUMENTS

| | | |
|---|---|---|
| 2,971,582 A | 2/1961 | Marsh |
| 3,165,156 A | 1/1965 | Kokesh |
| 3,396,799 A | 8/1968 | Anderson et al. |
| 3,603,264 A | 9/1971 | Von Arx |
| 4,112,850 A | 9/1978 | Sigel-Gfeller |
| 4,171,031 A * | 10/1979 | Marquis .................. G01V 3/18 340/856.1 |
| 4,415,030 A | 11/1983 | Walkow et al. |
| 4,438,810 A | 3/1984 | Wilkinson |
| 4,474,235 A | 10/1984 | Coshow |
| 4,595,055 A | 6/1986 | Vannier |
| 4,624,313 A | 11/1986 | Coshow |
| 4,771,830 A | 9/1988 | Peate |
| 4,823,125 A | 4/1989 | Rorden et al. |
| 5,111,891 A | 5/1992 | Kinnan |
| 5,322,391 A | 6/1994 | Fisk et al. |
| 5,355,950 A | 10/1994 | Zwart |
| 5,392,715 A | 2/1995 | Pelrine |
| 5,797,453 A | 8/1998 | Hisaw |
| 6,002,257 A | 12/1999 | Thomas et al. |
| 6,116,337 A | 9/2000 | Civarolo et al. |
| 6,209,667 B1 | 4/2001 | Murray et al. |
| 6,260,178 B1 | 7/2001 | Baugh et al. |
| 6,378,627 B1 | 4/2002 | Tubel |
| 6,405,798 B1 | 6/2002 | Barrett et al. |
| 6,536,531 B2 | 3/2003 | Brunet |
| 6,779,598 B2 | 8/2004 | Hall |
| 7,395,881 B2 | 7/2008 | McKay et al. |
| 7,757,782 B2 | 7/2010 | Tashiro et al. |
| 7,866,384 B2 | 1/2011 | Hall |
| 8,011,429 B2 | 9/2011 | McNay |
| 9,267,339 B2 | 2/2016 | Hall |
| 9,328,577 B2 | 5/2016 | HallundBaek et al. |
| 9,863,198 B2 | 1/2018 | McCormick |
| 10,364,627 B2 | 7/2019 | McCormick |
| 10,612,333 B2 | 4/2020 | McCormick |
| 11,047,191 B1 | 6/2021 | McCormick |
| 2003/0075321 A1 | 4/2003 | Hall |
| 2005/0252655 A1 | 11/2005 | McKay et al. |
| 2009/0003974 A1 * | 1/2009 | McNay ............... E21B 17/1057 166/241.1 |
| 2009/0145596 A1 | 6/2009 | Hansen et al. |
| 2009/0301709 A1 | 12/2009 | Cooper |
| 2011/0277990 A1 | 11/2011 | Kotsonis et al. |
| 2012/0018145 A1 | 1/2012 | Wheater et al. |
| 2012/0061098 A1 * | 3/2012 | Hall ....................... E21B 17/10 166/241.1 |
| 2012/0152523 A1 | 6/2012 | Hofman et al. |
| 2012/0222857 A1 | 9/2012 | McNay |
| 2013/0248208 A1 * | 9/2013 | Copold ............... E21B 17/1057 166/241.1 |
| 2014/0367169 A1 | 12/2014 | Wheater et al. |

FOREIGN PATENT DOCUMENTS

| | | |
|---|---|---|
| CN | 2016/35725 U | 11/2010 |
| FR | 2898635 A1 | 9/2007 |
| GB | 2483227 A | 3/2012 |
| WO | WO 1994/005941 A1 | 3/1994 |
| WO | WO 1999/053172 A1 | 10/1999 |
| WO | WO 2001/040615 A1 | 6/2001 |
| WO | WO 2005/116387 A1 | 12/2005 |
| WO | WO 2010/043881 A1 | 4/2010 |
| WO | 2010106312 A2 | 9/2010 |
| WO | WO 2010/106312 A1 | 9/2010 |
| WO | WO 2010/141028 A1 | 12/2010 |
| WO | WO 2013/067255 A1 | 5/2013 |

OTHER PUBLICATIONS

Marwaha, Sachin, Written Opinion of the International Search Authority, dated Mar. 19, 2014, 10 pages, PCT/NZ2013/000210, PCT/I SA Australian Patent Office.

Maukonen, Kalle, Supplementary European Search Report, dated Oct. 19, 2016, 10 pages, European Patent Office.

Maukonen, Kalle, European Examination Report, dated Dec. 11, 2018, 7 pages.

* cited by examiner

Section A-A

Section A-A

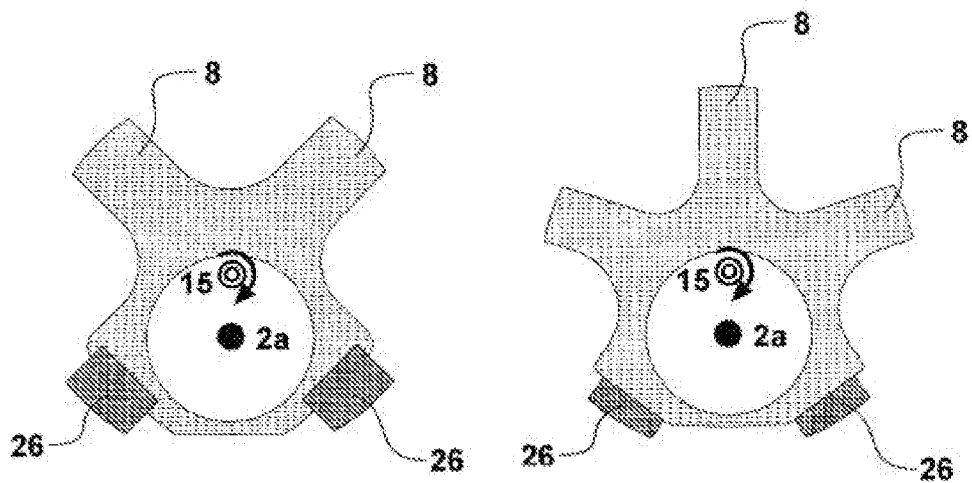
FIGURE 24  FIGURE 25
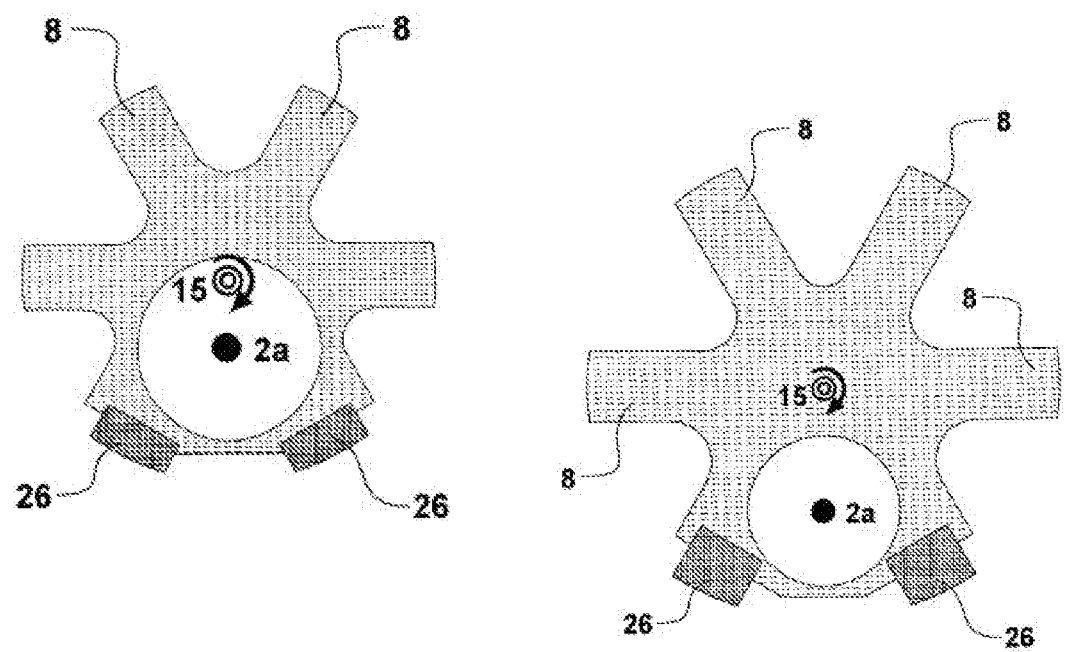
FIGURE 26
FIGURE 27

SENSOR TRANSPORTATION APPARATUS FOR A WIRELINE LOGGING TOOL STRING

CROSS REFERENCE TO RELATED APPLICATIONS

This application is a Continuation of Ser. No. 16/801,901 filed 26 Feb. 2020, which is a Continuation-in-part application of Ser. No. 16/027,113 filed 3 Jul. 2018, which is a Continuation-in-part application of Ser. No. 15/825,074 filed Nov. 28, 2017, which is a Continuation of Ser. No. 14/441,833 filed May 8, 2015, which is a National Stage of International Application No. PCT/NZ2013/000210, filed Nov. 15, 2013, the contents of all of which are incorporated herein by reference.

TECHNICAL FIELD

This invention relates to apparatus and methods for use in transporting sensor equipment, and in particular to apparatus and methods for use with wireline logging tool string applications.

BACKGROUND ART

Hydrocarbon exploration and development activities rely on information derived from sensors which capture data relating to the geological properties of an area under exploration. One approach used to acquire this data is through wireline logging. Wireline logging is typically performed in a wellbore immediately after a new section of hole has been drilled. These wellbores are drilled to a target depth covering a zone of interest, typically between 1000-5000 meters deep. A sensor package, referred to herein as an elongate sensor assembly, also known as a "wireline logging tool", "logging tool" or "tool-string" is then lowered into the wellbore and descends under gravity to the target depth of the wellbore well. The logging tool is lowered on a wireline—being a collection of electrical communication wires which are sheathed in a steel cable connected to the logging tool. Once the logging tool reaches the target depth it is then drawn back up through the wellbore at a controlled rate of ascent, with the sensors in the logging tool operating to generate and capture geological data.

There is a wide range of logging tools which are designed to measure various physical properties of the rocks and fluids contained within the rocks. The logging tools include transducers and sensors to measure properties such as electrical resistance, gamma-ray density, speed of sound and so forth. The individual logging tools are often combinable and are typically connected together to form a logging tool-string. These instruments are relatively specialised sensors, which in some cases need to be electrically isolated or located remote from metallic objects which are a source of noise in the data generated. Some sensors are designed to make close contact with the borehole wall during data acquisition whilst others are ideally centred in the wellbore for optimal results. These requirements need to be accommodated with any device that is attached to the tool-string.

The drilling of wells and the wireline logging operation is an expensive undertaking. This is primarily due to the capital costs of the drilling equipment and the specialised nature of the wireline logging systems. It is important for these activities to be undertaken and completed as promptly as possible to minimise these costs. Delays in deploying a wireline logging tool are to be avoided wherever possible.

One cause of such delays is the difficulties in lowering wireline logging tools down to the target depth of the wellbore. As the logging tool is lowered by cable down the wellbore by gravity alone, an operator at the top of the well has very little control of the descent of the logging tool. Logging tools can become held up on ledges of rock formed inside a well—usually found at the boundaries of hard rock layers where the adjacent rock layer crumbles. An operator may not immediately identify that a logging tool has become stuck on a ledge, and may also spend a significant amount of time reeling the cable and tool-string back in and attempting to move it past the obstruction formed by a ledge.

The chances of a wireline logging tools getting stuck or being impeded is also significantly increased with deviated wells. Deviated wells do not run straight vertically downwards and instead extend downward at an angle. Multiple deviated wells are usually drilled from a single surface location to allow a large area of interest to be explored. As wireline logging tools are run down a wellbore with a cable under the action of gravity, the tool-string will traverse the low side or bottom of the wellbore wall and immediately encounter any obstructions on the wellbore wall as it travels downwards to the target depth.

Furthermore, in deviated wells there is the potential for drilling cuttings to collect on the low side of the wellbore. Rock cuttings are more difficult to remove when the wellbore is deviated. The logging tool has to travel over or through these drilling cuttings, which can impede its progress and also collect in front of the logging tool. In some cases the logging tool may not be able to plough through the cuttings to reach the bottom of the wellbore.

Furthermore, as hole deviation increases, the sliding friction can prevent the logging tool descending. The practical limit is around 50-60° from the vertical, and in these high angle wells any device that can reduce friction is very valuable. The running of the tool-string over the low side surface of the borehole also needs to be taken into account in the design of the tool-string, and in particular the housing and the containment of its sensitive sensors and transducers.

Attempts have been made to address these issues in the deployment of wireline logging tools, as disclosed in U.S. Pat. Nos. 7,866,384, 7,395,881 and US patent application 20120061098. These patent specifications describe a number of different forms of an in-line roller devices integrated into the logging tool-string. These devices aim to reduce the friction experienced by a tool-string as it is run along the low side slope of a deviated wellbore.

This in-line positioning of roller devices increases the potential to cause damage to the logging tools as there are additional O-rings connections required that could potentially leak. Furthermore, there are multiple additional electrical connections that need to be made between the individual logging tools making up the logging tool-string. The additional components and tool-string length means it takes longer to connect and disconnect the tool-string, which slows down the wireline logging operation and therefore increases well costs. Further, there is a lack of flexibility inherent in this approach as in-line roller devices can only be placed between logging tools, and as some of these tools are quite long, in-line rollers may not keep the entire tool body off the borehole wall.

The rollers employed in these forms of prior art devices also have relatively small wheels with a minimal clearances. In deviated wellbores well drilling cuttings will collect on the low side of the well, and these small sets of rollers can struggle to make headway through piles of cuttings. In situations where large amounts of cuttings are encountered these small rollers can be of no assistance at all and simply add to the length and weight of an already unwieldy tool.

McNay patent U.S. Pat. No. 8,011,429 and Schlumberger patent application US2013248208 describe roller assemblies which slip over the logging tool, and are mounted such that they are free to rotate about the longitudinal axis of the tool. These devices have relatively small wheels which do not rotate easily over rough surfaces. In addition, it is often the central or side part of the wheel which is in contact with the wellbore wall, rather than the circumferential or radially extreme edge. This means that the wheels are often skidding rather than rotating. Neither of these devices has an active lubrication system which can prevent contaminants from entering and jamming the bearings.

All of these existing prior art devices attempt to assist a tool-string in travelling down a deviated wellbore. However, the devices do not assist in maintaining a known orientation of the tool-string, or a specific clearance or "standoff" between the active part of the tool-string and the wellbore wall.

US 684732 describes a sectional threading rod which is provided with wheels to reduce friction as the rod is pushed down a conduit. The wheels have an axle which is above the centre of the rod. However, the rod is not intended for use with a logging tool.

Other attempts to address the issues associated with deviated wellbores include a number of prior art "hole finding" devices. For example U.S. Pat. No. 4,474,235, US patent application US 20120061098, PCT publication WO 2010/106312 and US patent application US20120222857 all describe systems for wireline hole finding devices which rely on one or more rollers located at the nose at the bottom of a tool-string. The nose is the leading end at the bottom of the tool-string during descent of the wellbore. These rollers are arranged to allow the nose of the tool-string to roll into, and then up and over, irregularities and obstructions in a wellbore.

However due to the use of a number of metallic components these types of hole finding devices are not necessarily compatible with induction type resistivity tools which are generally the most commonly used sensor in such applications. Also, some logging tools are "bottom only", and have sensors which must be located at the lower extremity of the tool-string. The prior art hole finders are heavy and metallic and hence not compatible with such tools.

Furthermore, these systems are relatively complicated and must be appropriately designed and maintained to withstand the hostile environment experienced at depth in exploration wells. If the moving parts used in these systems cease to function the hole finder is ineffective. These designs are also relatively heavy and inflexible. Any impact forces or torque acting on the hole finder are transmitted into the tool-string, potentially causing damage to the sensors.

Another approach used in the design of hole finding devices is disclosed in US patent application US 20090145596. This patent specification describes an alternative hole finding system employed outside of wireline applications where a conduit, tubing or pipe is attached to the sensor tool in order to push it down the wellbore. This specification discloses a relatively complicated system which requires a surface operator to actively adjust the orientation of a nose assembly mounted at the bottom of the tool. The specification also discloses that this device requires a range of sensors that are used to detect sensor tool movement, and specifically if the sensor tool is held up. This form of hole finding system is again relatively heavy and complex. Furthermore, a dedicated operator is also required to monitor the progress of the sensor tool to actively adjust the orientation and angle of attack of the adjustable nose assembly when the sensors detect that the sensor device is held up as it moves down the wellbore. A similar design is described in US patent U.S. Pat. No. 7,757,782. This device is also an active system which requires manipulation from an operator at the surface to change the nose angle and azimuth in order in order to navigate past obstacles after the logging tool is obstructed.

It would therefore be of advantage to have an improved guide device which addressed any or all of the above issues. In particular, it would be of advantage to have an improved guide device which avoided obstacles—as opposed to having to negotiate obstacles. It would also be of advantage to have an improved guide device that did not require monitoring and active manipulation as the logging tool descends the wellbore. An improved guide device formed from a minimum number of metallic or conductive components, which includes no moving parts, which is easy to maintain and manufacture and which is lightweight and simple would be of advantage over the prior art. Furthermore it would also be of advantage to have an improved guide device which, if lost in an exploration well, could be drilled through to remove it as an obstruction.

It would also be of advantage to have an improved sensor transportation apparatus which addressed any or all of the above issues or at least provided an alternative choice. In particular, a sensor transportation apparatus which reduced the friction experienced by a wireline logging tool during deployment down a deviated well would be of advantage. An improved sensor transportation apparatus which could also be used to orient a tool-string would also be of advantage. Furthermore it would also be of advantage to have improvements which coped with the build-up or collection of drilling cuttings in deviated wells and/or which addressed the problems inherent in prior art in-line roller systems.

The reference to any prior art in the specification is not, and should not be taken as, an acknowledgement or any form of suggestion that the prior art forms part of the common general knowledge in any country.

DISCLOSURE OF INVENTION

According to one aspect of the present invention there is provided a sensor transportation apparatus to convey an elongate sensor assembly through a wellbore, the sensor transportation apparatus comprising:
- at least one engagement structure to connect the sensor transportation apparatus to the sensor assembly, and
- a pair of wheels arranged to rotate about an axis of rotation substantially perpendicular to a longitudinal axis of the sensor assembly when the transportation apparatus is connected to the sensor assembly, and
- an orientation structure comprising at least one orientation projection, in a transverse outline of the sensor transportation apparatus a said orientation projection extending between the pair of wheels so that the shortest distance between a centre of mass of the elongate sensor assembly and the wellbore wall is when the pair of wheels are in contact with the wellbore wall.

In some embodiments, the orientation structure defines a form having a transverse outline which has a rotational centre, wherein the rotational centre is offset from the centre of mass of the elongate sensor assembly so that, in use, the sensor transportation apparatus is oriented in a most stable position with the centre of mass of the elongate sensor assembly below the rotational centre and with the pair of wheels in contact with the wellbore wall.

In some embodiments, the sensor transportation apparatus has a single most stable orientation within the wellbore, in the single most stable orientation the sensor transportation apparatus oriented on the pair of wheels with the axis of rotation of the pair of wheels horizontal and with the elongate sensor assembly closest to the low side of wellbore wall.

In some embodiments, the orientation structure is configured to orient the sensor transportation apparatus in a most stable position with the pair of wheels in contact with a low side of the wellbore wall on an opposite side of the sensor transportation apparatus to the at least one orientation projection.

In some embodiments, each wheel has a diameter substantially greater than one of the diameter, width or height of the elongate sensor assembly.

In some embodiments, lateral extremities of the orientation structure substantially lie on a substantially circular curve.

In some embodiments, lateral extremities of the orientation structure substantially lie on a substantially circular curve which is centered at the rotational centre.

In some embodiments, in use, the axis of rotation of the pair of wheels is above the centre of mass of the elongate sensor assembly when the axis of rotation is substantially horizontal.

In some embodiments, the orientation structure comprises the pair of wheels.

In some embodiments, the orientation structure comprises the pair of wheels, and wherein a lateral extremity of the at least one orientation projection and bottom radial extreme edges of the pair of wheels lie on a circular curve with the centre of the curve at the rotational centre.

In some embodiments, the lateral extremity of the at least one orientation projection and top and bottom radial extreme edges of the pair of wheels lie on the circular curve with the centre of the curve at the rotational centre.

In some embodiments, the wheels run on bearings and the apparatus further comprises a lubrication delivery apparatus configured to provide a lubricant to the bearings at a pressure which is greater than ambient wellbore pressure, the lubrication delivery apparatus comprising a lubrication reservoir with an elastic diaphragm, wherein an exterior side of the elastic diaphragm is subject to ambient pressure.

In some embodiments, the engagement structure is adapted to engage an exterior surface of the elongate sensor assembly or is adapted for in-line connection to the elongate sensor assembly.

In some embodiments, the apparatus further comprises a guide device, the guide device comprising: a base adapted to engage an end of the elongate sensor assembly and a nose section having a tip which is offset from the longitudinal axis of the elongate sensor assembly when the guide device is engaged with said sensor assembly.

In some embodiments, the elongate sensor assembly comprises a sampling tool oriented to take a sample and/or measurement from a high-side, a low side and/or a horizontal side of the wellbore with the sensor transportation apparatus in the most stable position.

In another aspect, the invention provides a logging tool assembly comprising an elongate sensor assembly and a sensor transport apparatus as described above. The elongate sensor assembly comprises a sampling tool oriented to take a sample and/or measurement from a desired side of the wellbore when the pair of wheels are in contact with the wellbore wall with the apparatus in a single most stable position. The sampling tool may be oriented to take a sample and/or measurement from a high-side, a low-side, or a horizontal side of the wellbore.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent from the following description given by way of example of possible embodiments of the invention.

BRIEF DESCRIPTION OF THE DRAWINGS

An example embodiment of the invention is now discussed with reference to the drawings in which:

FIG. 6b shows a perspective view of the transportation apparatus of FIG. 6a.

FIG. 24 shows a transverse cross-section of another embodiment of an orientation structure which is provided with low friction skids.

FIG. 25 shows a transverse cross-section of another embodiment of an orientation structure which is provided with low friction skids.

FIG. 26 shows a transverse cross-section of another embodiment of an orientation structure which is provided with low friction skids.

FIG. 27 shows a transverse cross-section of another embodiment of an orientation structure which is provided with low friction skids.

BEST MODES FOR CARRYING OUT THE INVENTION

Figure 2:
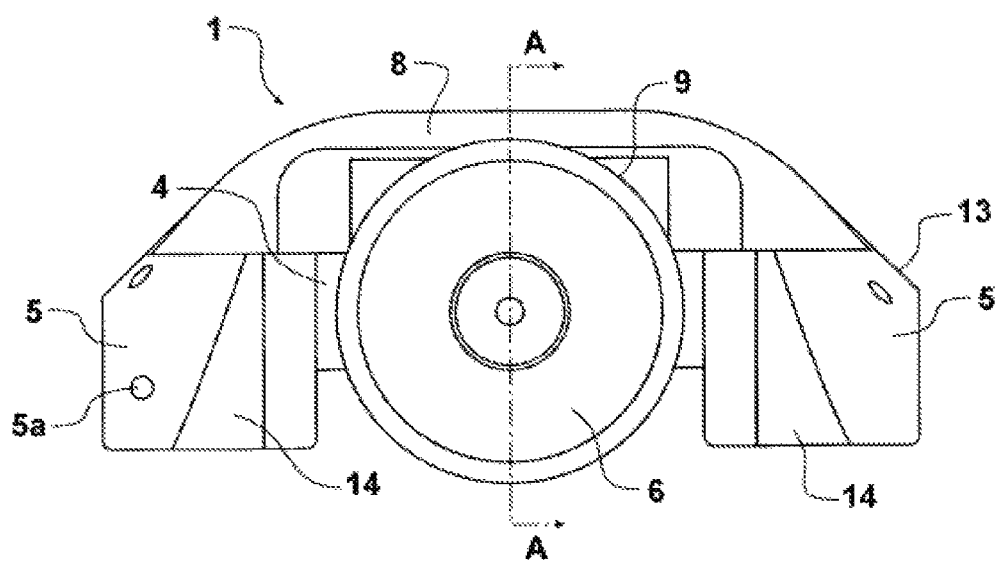
FIG. 2 shows a side view of the transportation apparatus of FIG. 1
Figure 3:
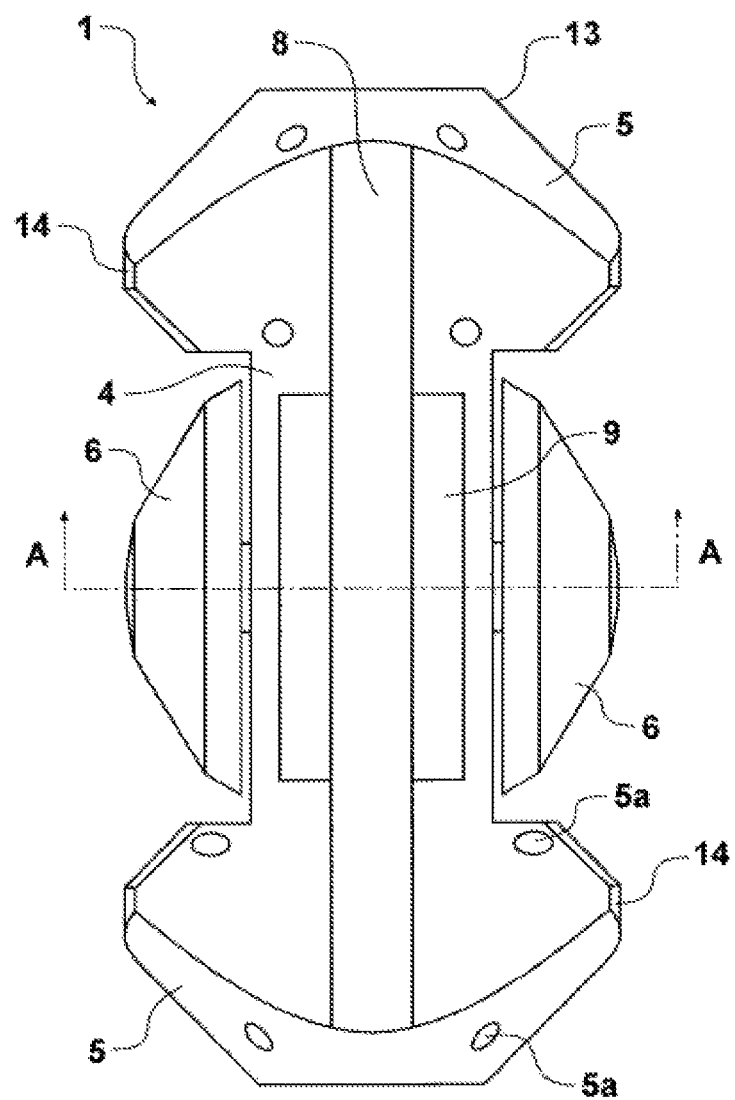
FIG. 3 shows a top view of the transportation apparatus of FIGS. 1 and 2.
Figure 4:
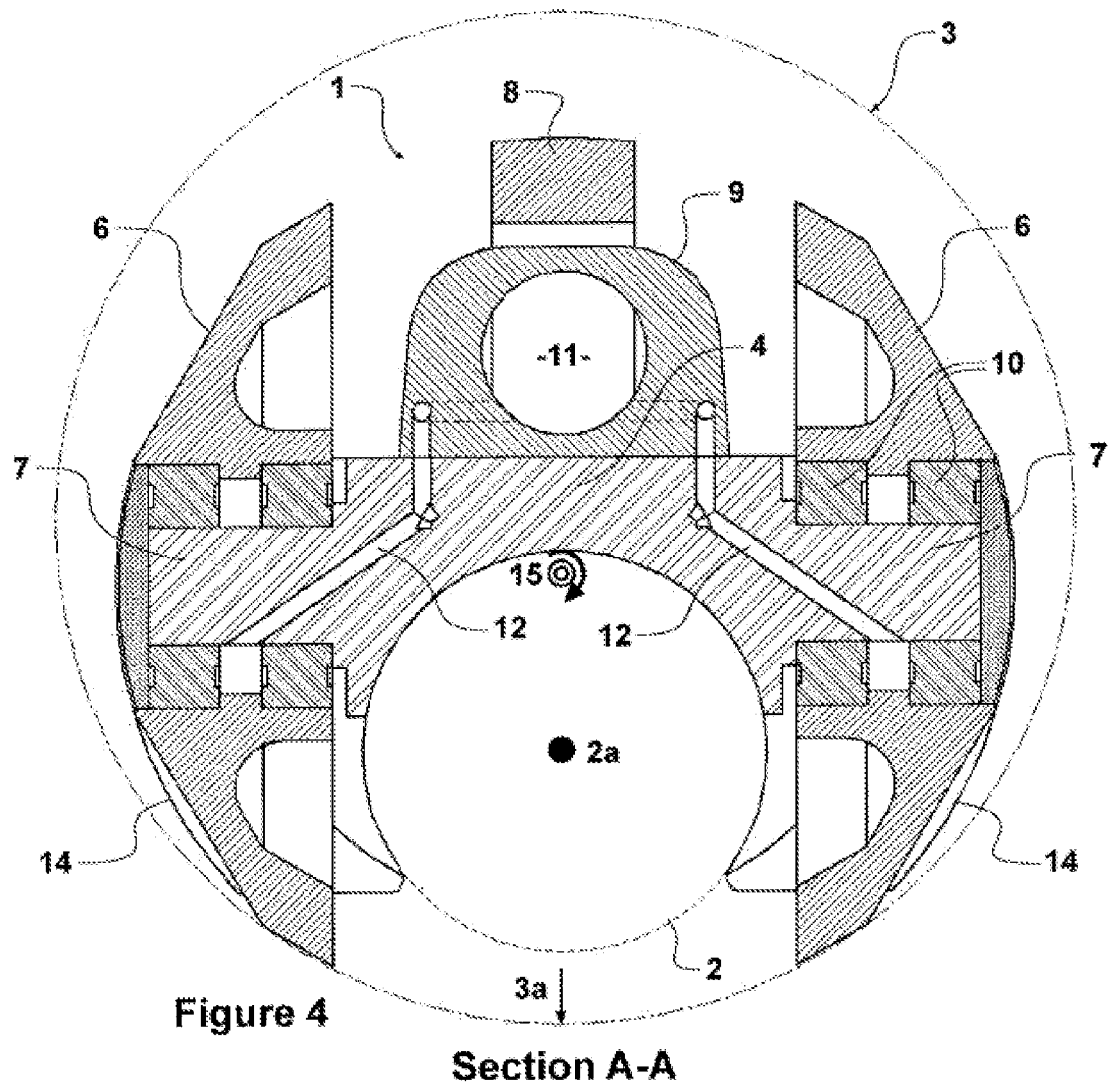
FIG. 4 shows a cross-section along plane A-A of the transportation apparatus of FIGS. 1-3, and shows the integral lubrication delivery apparatus. The wellbore wall is shown in outline.

FIGS. 1-4 show a number of views of the transportation apparatus 1 as provided. In this embodiment the transportation apparatus is arranged to connect over or on to the exterior surface of an elongate sensor assembly—shown in cross-section in FIG. 4 as a tool-string 2 used in a wireline logging applications. FIG. 4 also illustrates the position of the longitudinal axis 2a of the tool-string 2. As used herein the phrase "elongate sensor assembly" includes both the sensors themselves, and any equipment attached to the sensors such as weights, spacers, flexible couplings and the like.

FIG. 4 illustrates the perimeter walls of a wellbore 3 which the tool-string 2 is to be conveyed down by the transportation apparatus 1. For the sake of convenience the wellbore 3 is shown with a substantially horizontal orientation, with its low side 3a shown at the bottom of the page.

The transportation apparatus 1 includes the main body 4, used to mount and locate the remaining elements or components of the apparatus.

Figure 1:
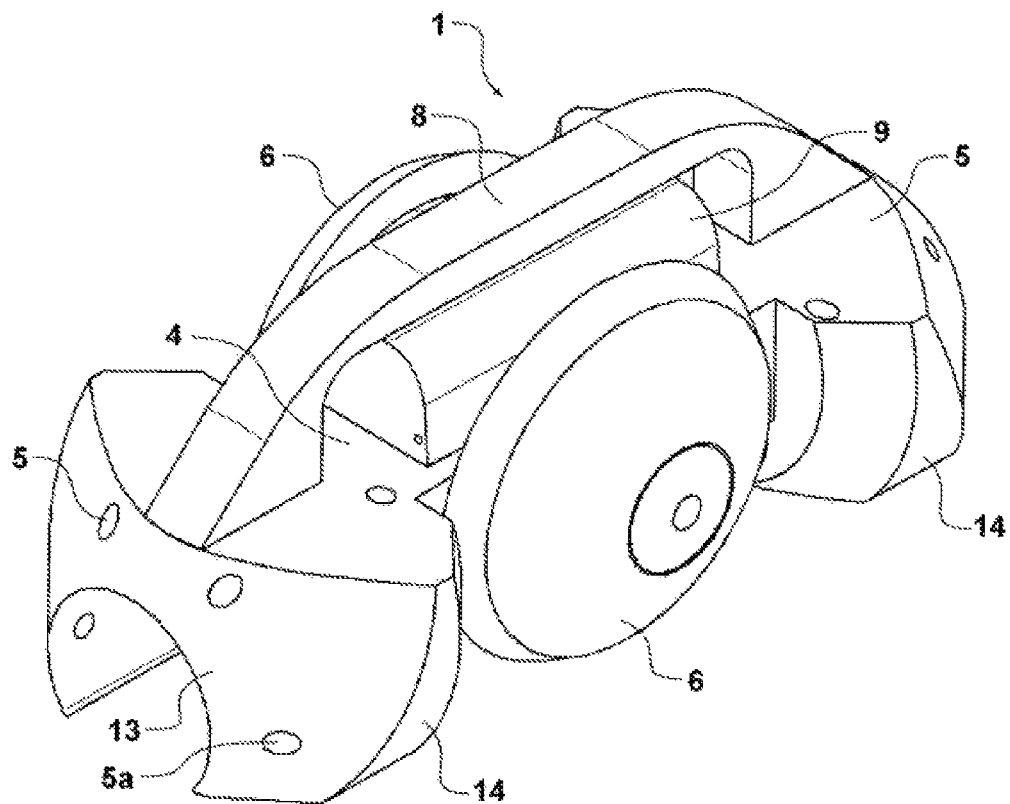
FIG. 1 shows a isometric view of a sensor transportation apparatus as configured in accordance with a preferred embodiment of the invention.

FIGS. 1 through 3 show details of a pair of engagement structures formed in this embodiment by integral locking collars 5. These locking collars 5 are located at either end of the apparatus 1. Each collar 5 is arranged to partially enclose the exterior side wall surface of the tool-string 2, allowing the transportation apparatus to be slid on and over the tool-string at any desired position along the length of the tool-string. Each collar includes a series of threaded holes 5a arranged to receive a screw which engages with a recess or blind hole in the exterior surface of the tool-string. These threaded holes 5a and an associated set of screws are used to lock the apparatus 1 to the tool-string 2 with a specific orientation. By arranging the collars 5 to only partially enclose the tool-string 2, the tool-string can be carried in a lower position than would be possible if the collars 5 were to completely encircle the circumference of the tool-string 2. The body with threaded holes 5a and screws provide an engagement structure to connect the transportation apparatus to the sensor assembly and prevent relative rotation between the sensor transportation apparatus as the elongate sensor assembly.

The main body of each of these collars also defines or forms a protection structure 14 which protects wheels deployed on either side of the body from impact and abrasion. These protection structures also serve to orientate the carriage and tool-string assembly in the wellbore. These protection structures can also prevent the space between the wheel and tool-string 2 catching on wellbore projections, such as the casing shoe, as the tool-string 2 is pulled up and out of the wellbore. As can be seen from at least FIG. 1 these protection structures may incorporate an angled surface projection 13 which can act to position the sensor assembly and transportation apparatus in the wellbore and guide the tool down the wellbore.

FIGS. 1 through 4 also show the provision of a pair of wheels 6 which form part of the transportation apparatus 1. These wheels 6 are deployed laterally adjacent to one another on opposite sides of a tool-string. In the embodiment shown each wheel rotates on a stub axle 7. The wheels 6 have an axis of rotation which is perpendicular to a longitudinal axis of the elongate sensor assembly. In the embodiment shown, the wheels have a common axis of rotation.

As can be seen from these figures each wheel 6 has a diameter substantially greater than one of the diameter, width or height of the tool-string 2. This allows each of the wheels 6 to make radial contact with the wall of the wellbore 3 (that is, the radial edge of the wheels makes contact with the wellbore wall). The large relative size of each wheel 6 lifts the tool-string 2 from the low side surface of the wellbore 3, allowing the transportation apparatus 1 to convey the tool-string 2 down the wellbore 3. These large wheels allow the transportation apparatus 1 to roll along rugose borehole walls, up and over obstructing ledges which would normally impede the progress of the wireline logging tool-string 2. The wheels are widely spaced in the wellbore with a broad wheel track which allows the wheels to bridge over obstructing wellbore cuttings which tend to sit on the low side of the hole 3a. In preferred embodiments the wheels 6 extend below the main body 4 and below the sensor engaged with the apparatus, and thereby create a minimum clear space of at least 10 mm, more preferably at least ½ inch, between the tool string 2 (and the body) and the bottom of the wellbore.

Figure 5:
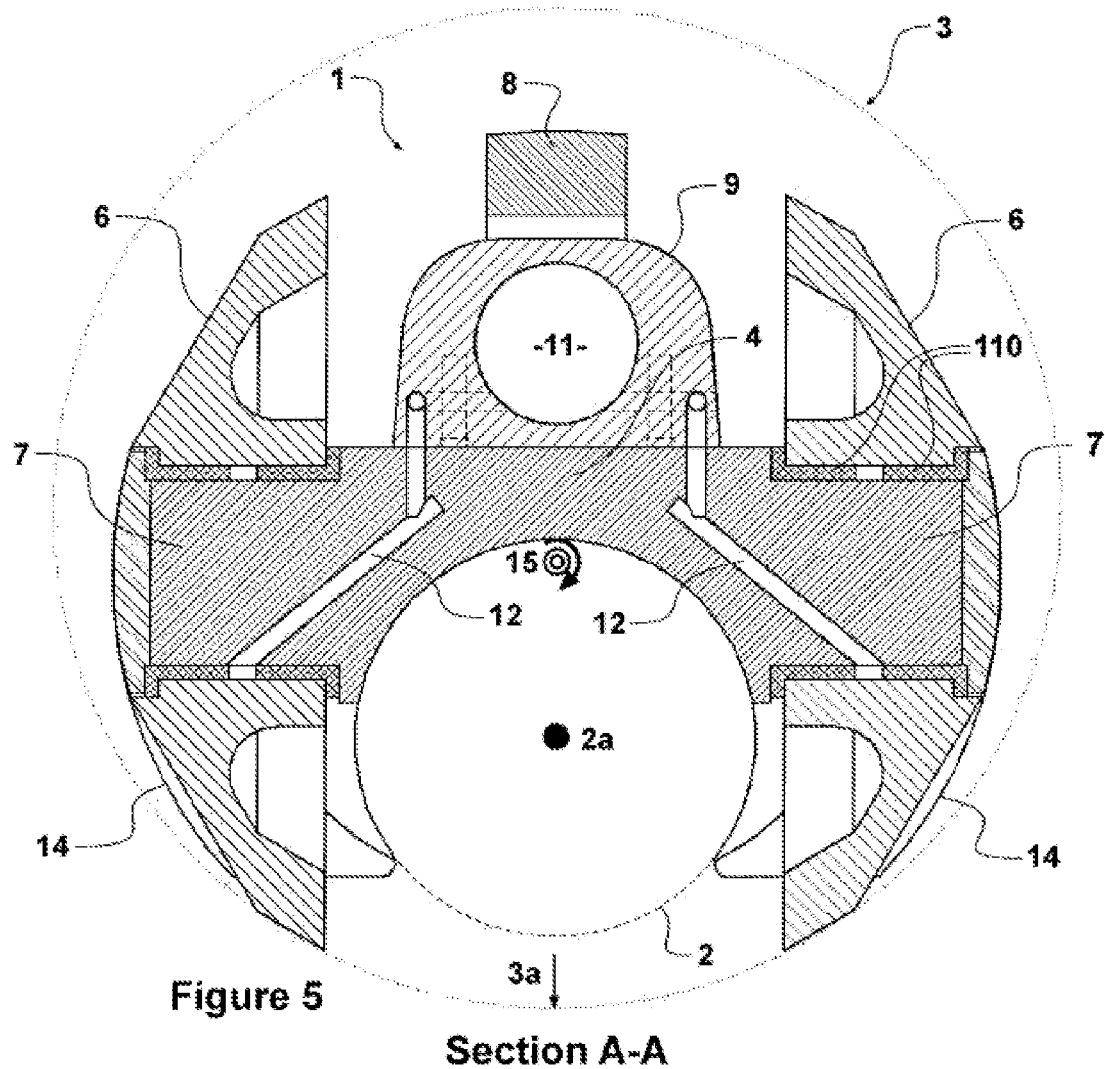
FIG. 5 shows a cross-section of an alternative embodiment along plane A-A. The wellbore wall is shown in outline.

FIG. 4 shows a cross-section view of the transportation apparatus of FIGS. 1-3 along the plane A-A shown in FIGS. 2 and 3. FIG. 5 shows similar view to FIG. 4 of a cross-section view of the transportation apparatus provided in a further embodiment. In the embodiment shown with respect to FIG. 4 a double set of ball bearing assemblies 10 are used, whereas in FIG. 5 the wheels rotate over a set of bushes 110.

FIGS. 4 and 5 show the positioning and arrangements of the axis of rotation of each wheel 6 as provided by stub axles 7. As can also be seen from these figures each of these stub axles 7 is located above the longitudinal axis 2a of the tool-string 2. The longitudinal axis is essentially the axial or longitudinal centre of mass of the tool-string. As the tool-string 2 is much heavier than the transportation apparatus 1 the tool-string 2 will tend to rotate into the orientation shown in FIG. 4 where the transportation apparatus sits squarely on both wheels.

Identified on these figures is the rotational centre 15 of the transportation apparatus and the centroid 2a or centre of mass of the tool-string. In the embodiment shown each section of the tool-string has a centre of mass 2a approximately in the middle of the circular section of the tool-string. The rotational centre 15 of the transportation apparatus is located above the centroidal axis 2a of the tool-string. The centroidal axis of the tool-string, as that phrase is used herein, is formed by the line joining the centre of mass of each cross-section along the length of the tool-string. The axis of rotation of the wheels 6 preferably passes through the rotational centre 15.

The body 4 also mounts an orientation structure comprising at least one orientation projection 8. As can be seen from FIG. 4 the orientation projection 8 assists in providing the tool-string 2 with a predictable orientation within the wellbore 3. If the tool-string 2 were to rotate to place the orientation projection 8 in contact with the low side of the wellbore 3 this would make the position of the combined transportation apparatus and connected tool-string 2 unstable. The orientation projection 8 therefore assists in positioning and orientating the tool-string in the arrangement shown in respect of FIG. 4. The radially extreme edges of the wheels 6 and the protection structure 14 also form part of the orientation structure and assist in orientating the tool-string in the orientation shown in respect to FIG. 4.

FIGS. 4 and 5 also show the form provided through a cross-section of the transportation apparatus made through all of its orientation projections 8, protection structures 14 and wheels 6. This form has a transverse outline (that is an outline or silhouette when viewed along the longitudinal axis of the sensor assembly) which has a rotational centre 15. The position of this rotational centre is the point which experiences the minimum vertical displacement when the form is rolled over a flat horizontal surface. In preferred embodiments the extremities of the orientation structure lie on a substantially circular imaginary curve centred on the rotational centre 15. The rotational centre of the transportation apparatus is offset from the centroid or centre of mass of the tool-string 2a.

The offset between the rotational centre of the transportation device and centre of mass of the tool-string ensures the assembly is orientated in the most stable position with the tool-string centre of mass below the rotational centre of the transportation apparatus. In this stable position the tool-string descends down the wellbore carried on the wheels of the transportation apparatus. As shown in FIGS. 4 and 5, in the most stable position the tool-string 2 is closest to the low side of wellbore wall.

The orientation structure operates to rotate the apparatus and connected sensor assembly within the wellbore to achieve the most stable orientation. The most stable orientation achieves a known/desired sample direction for the sensor assembly within the wellbore, and additionally orientates the apparatus to reduce friction between the sensor assembly and wellbore to allow the sensor assembly to successfully traverse the low side of wellbore.

Figure 49:
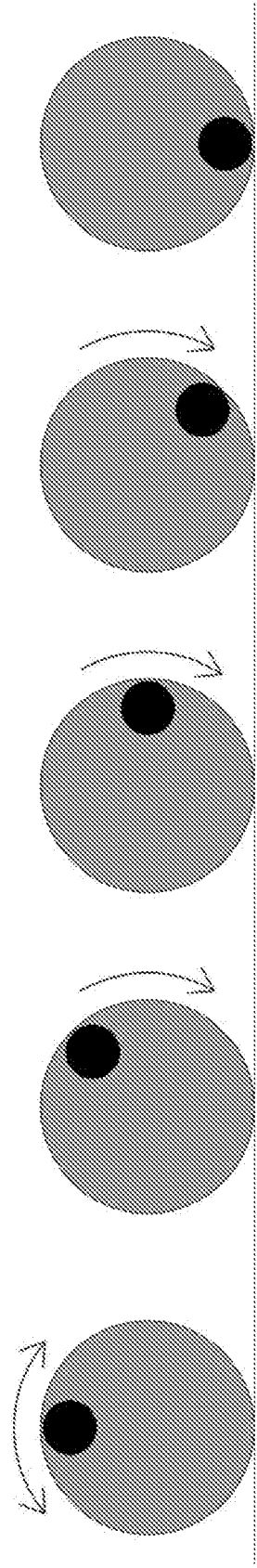
FIG. 49 shows a sequence of an asymmetrically weighted ball rolling over a flat surface to demonstrate an orientation feature of an embodiment of the invention.

Due to the rotational centre of the device being offset from the centroidal axis of the sensor assembly, the apparatus 1 with elongate sensor assembly 2 'rights' itself from any unstable position to a known stable orientation within the wellbore, much like the way in which a cylinder with an eccentric weight assumes a most stable position if rolled over a flat surface as illustrated in FIG. 49.

A flat surface essentially approximates a very large bore; thus FIG. 49 illustrates the invention works in any wellbore that is large enough to accept the transportation apparatus 1.

Figure 50:
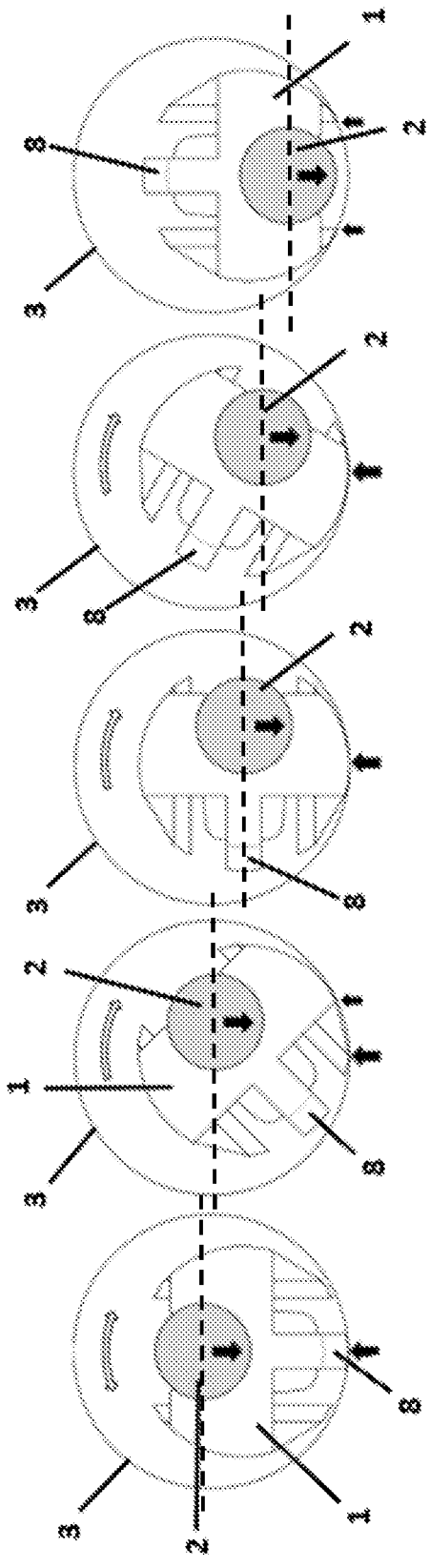
FIG. 50 shows a sequence of the transportation apparatus of FIGS. 1-4 in a wellbore righting itself from an invented position to a most stable position with the apparatus on its wheels.

A sequence of the apparatus 1 of FIGS. 1 to 4 righting itself from an inverted position to the most stable position within a wellbore 3 is illustrated in FIG. 50. In FIG. 50 the diagram on the left shows the apparatus 1 in the inverted position. In this position the mass of the tool string 2 is in a highest, most unstable position. The diagram on the right of FIG. 50 shows the apparatus 1 sitting on the wheels. In this position the mass of the tool string 2 is in in the lowest, most stable position. As the apparatus and tool string rotates from the inverted position to the lowest most stable position, as displayed in the diagrams left to right, the tool string mass is progressively in a lower, more stable, position as indicated by the dashed lines extending through the centre of the tool string 2 moving downwards in the diagrams from left to right in FIG. 50. In the most stable position, with the tool string 2 carried on the wheels, the tool string cannot rotate to away from the most stable position to a less stable position because such a rotation is equivalent to rolling up a slope against gravity. In a wireline logging operation, the wireline cable is relatively flexible and is not able to prevent the apparatus 1 with tool string 2 from rotating to the most stable position. Further, since the wireline cable is relatively flexible it is not able to cause the apparatus and tool string from rotating away from the most stable position.

Referring in particular to FIG. 4, in this embodiment the rotation of each wheel 6 is lubricated by a pressurised lubrication system 9 as it rotates about a double set of ball bearing assemblies 10. FIG. 5 shows an alternative arrangement of the transportation apparatus where the lubrication system 9 acts on a set of bushes 110. This lubrication system 9 includes a lubricant reservoir 11 and pressurising plunger linked to the bearings 10 or bushes 110 by a pair of channels 12. In other embodiments the plunger may be replaced by a set of elastomer bellows, or by an elastic diaphragm, as is described further below. The plunger is maintained at a higher pressure than the surrounding wellbore fluids thereby force feeding lubricant to the wheel bearing or bush surfaces via the channels 12. Pressurisation of lubricant at this point in the apparatus prevents the entry of exterior contaminants from the wellbore 3.

Figure 6A:
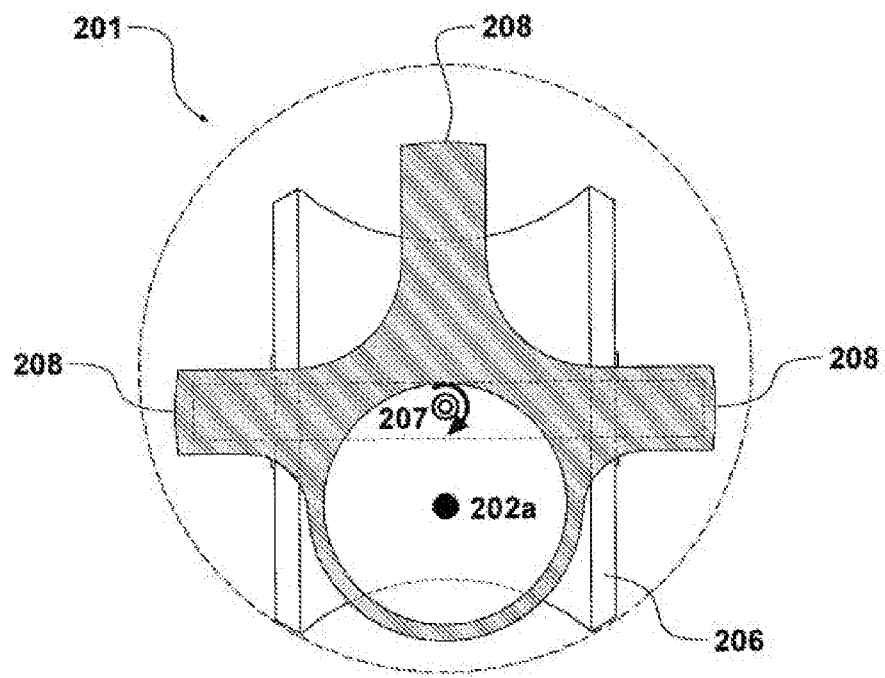
FIG. 6a shows a front view of a transportation apparatus provided in accordance with an alternative embodiment to that shown in FIGS. 1-5, with the wellbore shown outline.
Figure 6B:
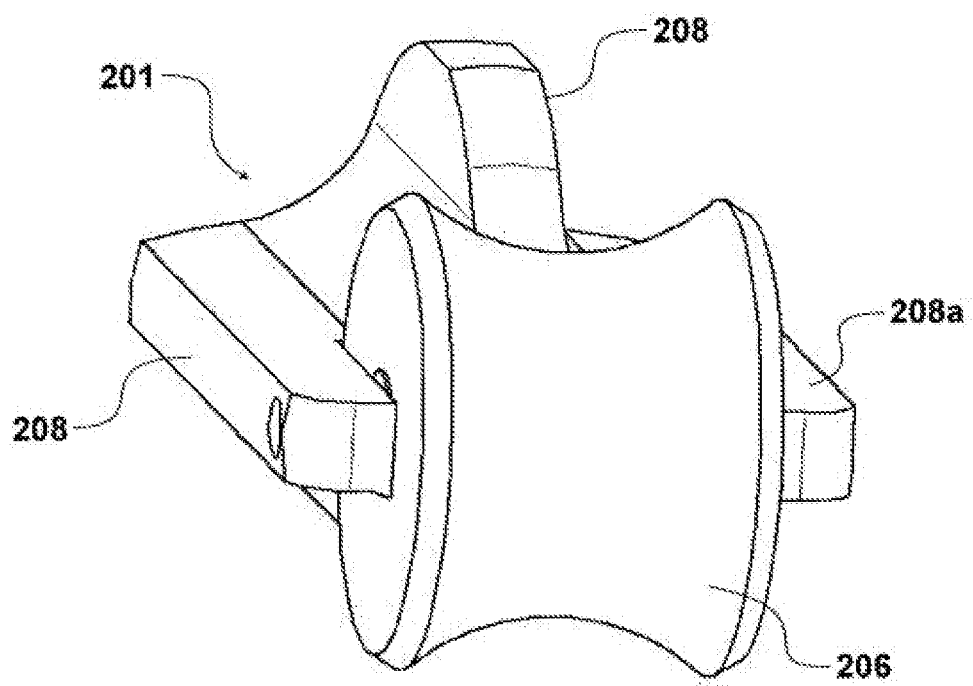
Figure 7:
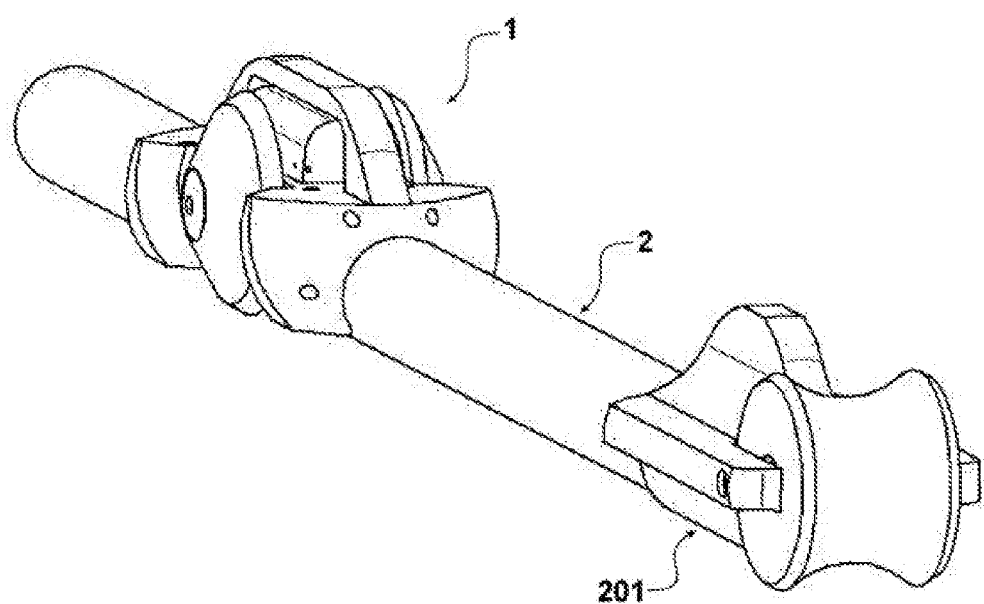
FIG. 7 shows a perspective view of a wireline tool-string engaged with both the transportation apparatus illustrated in respect to FIGS. 6a and 6b in addition to the apparatus shown with respect to FIGS. 1-4.

FIGS. 6a and 6b show cross-section and isometric views of a transportation apparatus 201 provided in accordance with alternative embodiment to that shown in FIGS. 1-5. FIG. 7 shows an isometric view of a wireline tool-string 2 engaged with both the transportation apparatus illustrated in respect to FIGS. 6a and 6b in addition to the apparatus shown with respect to FIGS. 1-4.

In the embodiment of the apparatus shown in FIG. 6b the transportation apparatus 201 is arranged to engage with the bottom end or nose of a tool-string, thereby forming the leading component deployed down a wellbore. In this embodiment of the transportation apparatus 201 includes a single wheel 206 deployed as the leading component of the apparatus. This single wheel can act as a hole finding assembly which can encounter and then roll over the top of obstacles immediately in the path of the tool-string. As can also be seen from FIGS. 6a and 6b the wheel 206 has a scalloped or concave profile, allowing it to bridge cuttings and obstacles encountered in the middle of the low side of the wellbore. The wheel is scalloped to ensure that only the edges of the wheel contact the wellbore wall resulting in a wide wheel track width, lower rolling friction and greater stability in the operating position.

The axis of rotation of the wheel 206 is above the centreline or longitudinal mid-line axis 202a of the tool-string which defines the longitudinal or axial centre of mass of the tool-string. Furthermore, the apparatus 201 has an orientation structure which in this embodiment comprises multiple orientation projections 208 arranged to assist in maintaining this desired orientation of the tool-string. The orientation projections 208a also function as protection structures and protect the wheels. As can be seen in FIGS. 6a and 6b, one or more of the orientation projections 208a may also provide a mounting point for mounting the wheel 206 or wheel axle.

FIG. 6a also shows the form provided through a cross-section view of the transportation apparatus 201 made through all of its orientation projections 208 and the end view of wheel 206. This form has a transverse outline with a rotational centre 207. The rotational centre is substantially parallel to and offset from a central axis of the elongate sensor assembly. The rotational centre of the transportation apparatus is offset from the centroid or centre of mass of the sensor assembly/tool-string 202a.

As with the embodiments described above, the offset between the rotational centre of the transportation device and centre of mass of the tool-string ensures the assembly is orientated in the most stable position with the tool-string centre of mass below the rotational centre of the transportation device. In this stable position the tool-string descends down the wellbore carried on the wheels of the transportation device.

FIG. 7 shows how these two different implementations of the transportation apparatus can be deployed in conjunction with a single tool-string 2 to form a system for transporting the tool-string. The single wheeled apparatus 201 is used to lift the bottom end or nose of the tool-string while the paired wheels of the transportation apparatus 1 is used to carry the upper section of the tool-string 2. In another embodiment the transportation apparatus may be provided with a partial orientation structure, or no orientation structure at all. In these embodiments a separate component may carry some or all of the orientation structure. For example, a tool-string may be provided with a transportation apparatus and one or more of the orientation structures shown in FIG. 20, 21 or 33. The relative positioning of the separate components of the orientation structure along the sensor assembly is not critical, provided the overall form has a transverse outline with a rotational centre.

Figure 8:
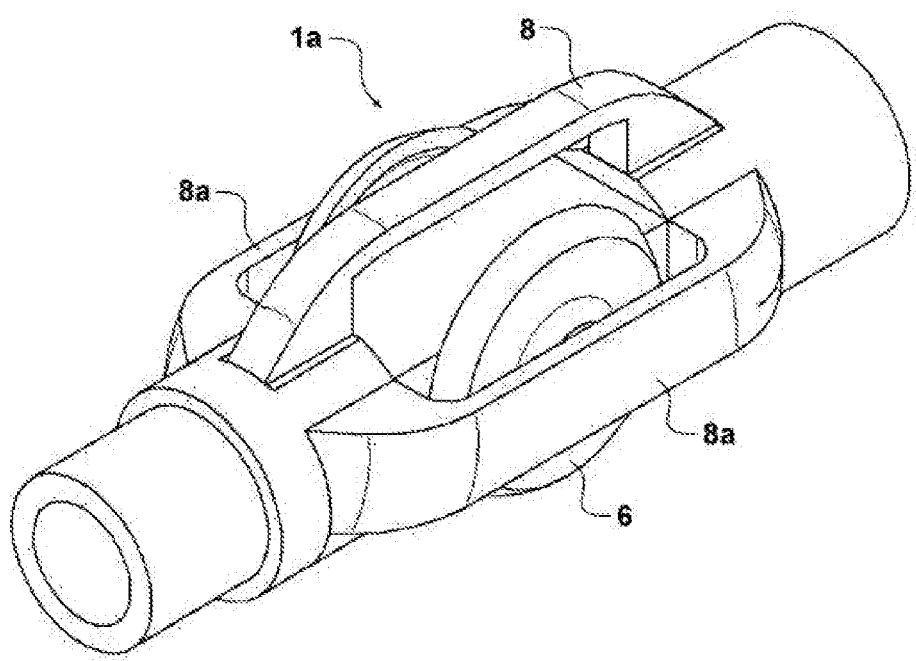
FIG. 8 shows an isometric view of a further embodiment of the transportation apparatus.
Figure 9:
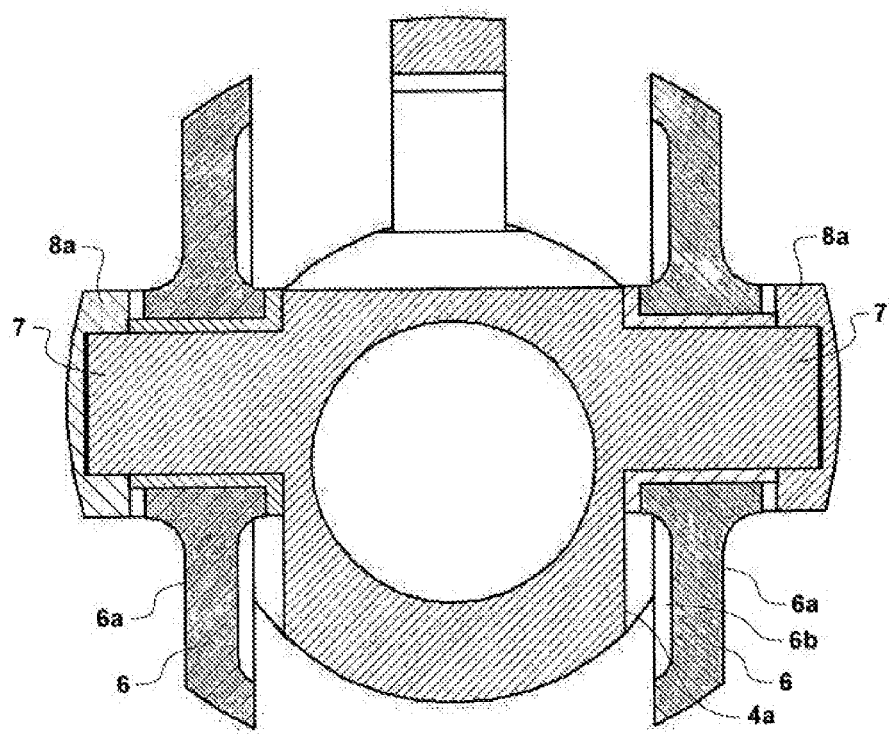
FIG. 9 shows a cross-section view of the embodiment shown in FIG. 8.

FIGS. 8 and 9 show an alternative embodiment of the transportation apparatus 1a. This embodiment is configured for in-line connection to a sensor assembly, rather than mounting over the sensor or other sensor assembly component. As can be seen, the transportation apparatus 1a is provided with an orientation structure which includes a protection structure which includes removable orientation projections 8a which extend from in front of the wheels, around an exterior surface 6a of the wheels 6. These orientation projections 8a are shaped to assist in preventing material from clogging the space between the inside surface of the wheel 6b and the corresponding exterior surface of the main body 4a.

The width of the wheels 6 is preferably allows a clearance space between the inner surface of the wheel and the body, and between the outer surface of the wheel and the protection structure. In a preferred embodiment there is at least 4 mm clearance between the operating surface of the wheels and the surrounding body and structure, as is described further below.

As is best seen in FIG. 9, in this embodiment the orientation projections 8a also operate to support the outer ends of the stub axles 7 on which the wheels 6 are mounted. Those skilled in the art will appreciate that in an alternative embodiment (not shown) the stub axles 7 may be permanently connected to or integral with the removable orientation projections 8a, and may be engaged with and supported by the body 4a at their inner ends.

As shown in the cross-section view of FIG. 9, the wheel 6 diameter is greater on the inner face 6b than the outer face 6a to fit to the circular wellbore profile. This variation in wheel diameter causes some skidding at the contact surface between the wheel and the wellbore wall as the wheel rotates. Preferably the wheel should be narrow in order to minimise skidding contact and provide the least friction between the wheel and the wellbore wall as the wheel rotates down the wellbore. As can be seen from these figures, the width of the wheels 6 is less than about 20 mm, preferably less than 18 mm. In one embodiment shown in FIG. 9 the wheel width is 10 mm. In another preferred embodiment shown in FIG. 42 the wheel width is 15 mm.

Figure 10:
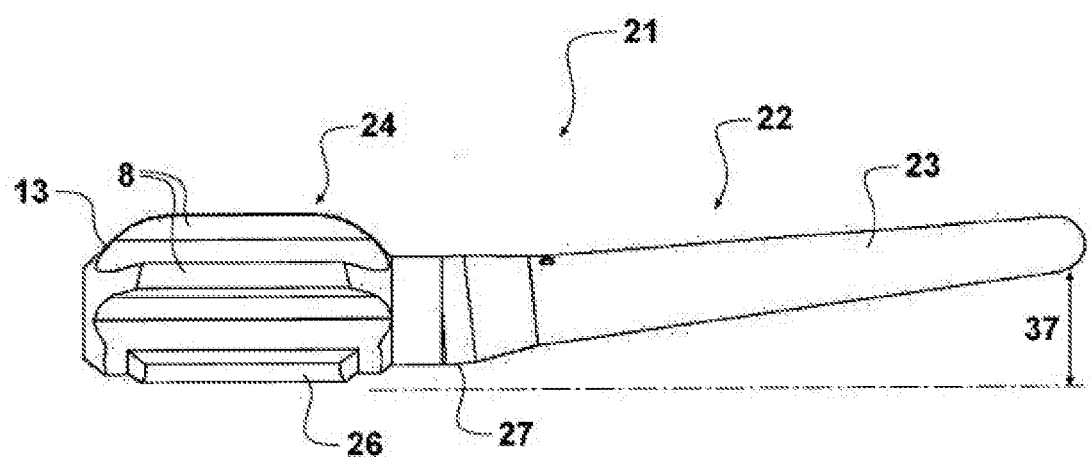
FIG. 10 shows a side view of a guide device provided in accordance with one embodiment of the invention.
Figure 11:
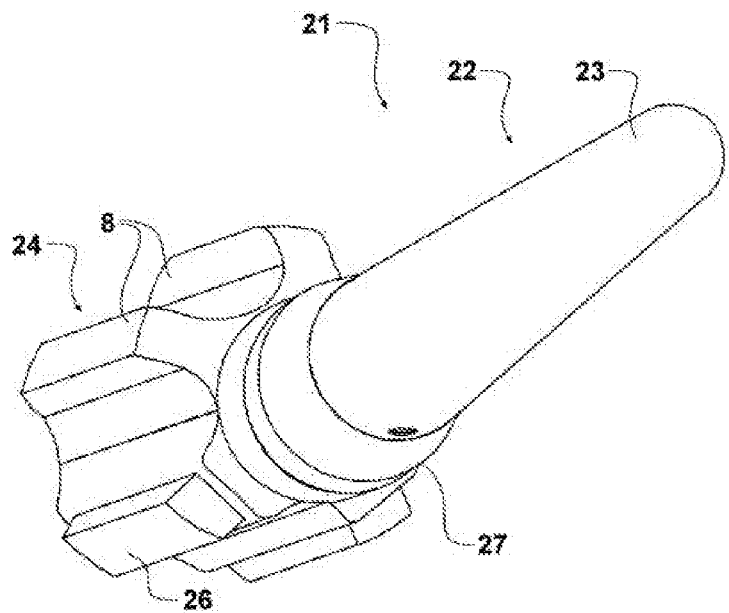
FIG. 11 shows a front perspective view of the guide device of FIG. 10.
Figure 12:
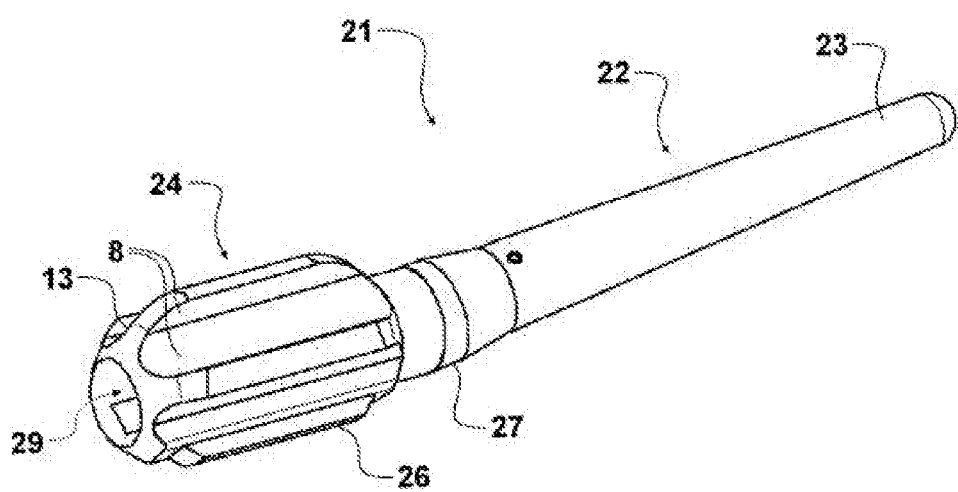
FIG. 12 shows a rear perspective view of the guide device of FIG. 10.

FIGS. 10 to 12 show a number of views of a guide device 21. The guide device 21 includes a nose assembly 22 formed from a nose section 23 and a base 27, as shown in FIGS. 10 and 11. Directly attached to the nose assembly 22 is an orientation structure 13, provided in the embodiment shown by an orientated stand-off 24.

The orientated stand-off 24 provides a sleeve like structure with a hollow interior cavity 29 arranged to receive the leading end of the wireline logging tool-string. The orientated stand-off 24 includes a pair of friction reducing elements, in this case travel skids 26, which are oriented to slide along the downside wall of the wellbore through the action of a set of three orientation projections 8 provided by the orientated stand-off 24. In the embodiment shown the travel skids 26 are formed from a durable ceramic material which has low friction characteristics and resists abrasion, and the effects of high temperatures and high alkaline conditions found in a wellbore, for example alumina ceramic or polymetallic oxide thermosetting ceramic. In other embodiments suitable plastic or elastomer materials can also be used for this component. When provided with such friction reducing elements the orientated standoff 24 can function as a transportation apparatus, although wheels may be necessary for high deviation angles.

The travel skids, when provided, may be designed for use in a specific wellbore diameter, and may be shaped to conform to the curvature of the wellbore wall. The leading and trailing edges of the travel skids are contoured to form a gentle entry to allow the skids to "ski" over mudcake and cuttings debris.

The travel skids are positioned on the orientated standoff so that they do not travel over the lowermost section of the wellbore where cuttings are likely to accumulate. Rather, the skids straddle the cuttings and are positioned laterally in on the borehole wall, preferably between 30° and 45° from a vertical plane through the longitudinal axis of the sensor assembly.

The orientation structure 24 comprising the projections 8 has an engagement structure to connect the orientation structure to the tool-string to prevent relative rotation between the structure 24 and the tool-string. The engagement structure may comprise threaded holes and associated screws to engage the tool-string to lock the structure 24 to the tool string, as described below with reference to FIG. 46. As is described above with reference to FIGS. 1 to 4, the orientation projections 8 act to destabilise the position of the tool-string if placed in contact with the low side wall of a deviated wellbore. The substantial weight of the tool-string will ensure that if one of these projections is in contact with the down side wall, the tool-string will rotate back about it's longitudinal axis to an orientation placing the travel skids in contact with the downside wall.

As can be seen from FIGS. 10 to 12, the nose section 23 has a fixed offset angle relative to the longitudinal axis of any tool-string engaged with the interior cavity 29 of the orientated stand-off 24. This arrangement provides the nose section 23 with a permanent upward inclination as the combined guide device and tool-string is deployed down a deviated wellbore. The upward inclination of the nose section ensures that the nose section tip 36 is elevated above the low side of the wellbore by a height 37, and is offset from and above the longitudinal axis of the tool-string. Hence obstacles on the low side wall of the wellbore are avoided by the guide device with the tool-string following immediately after the nose assembly.

Figure 13:
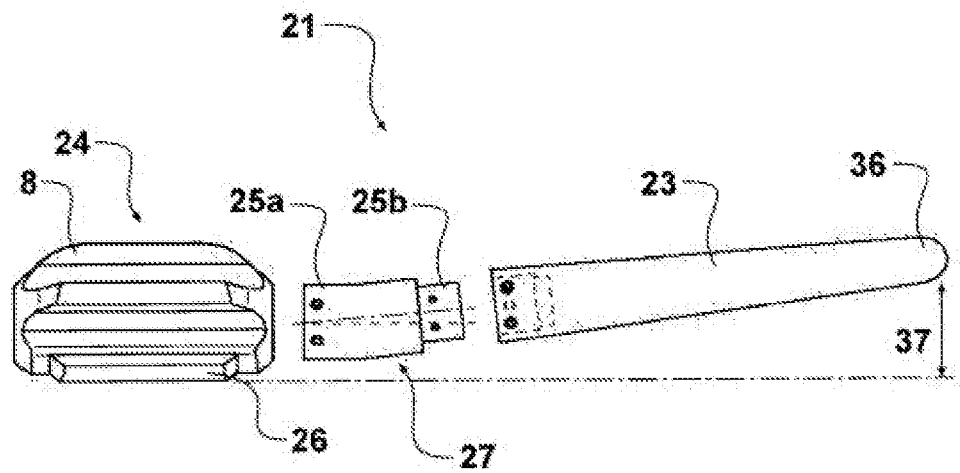
FIG. 13 shows an exploded side view of another embodiment of the guide device.
Figure 14:
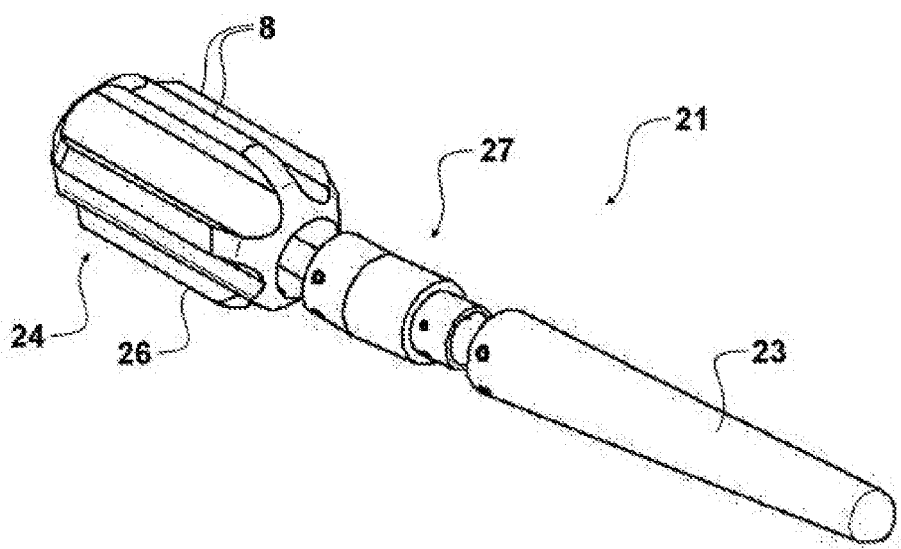
FIG. 14 shows an exploded perspective view of the guide device of FIG. 13.

FIGS. 13 and 14 show an exploded view of a further preferred embodiment of the guide device. The guide device includes a nose section 23, a base 27 and an orientation structure 24. All three components may be partially or fully integrated (not shown) or provided as discrete components as in the embodiment shown. In the embodiment shown the base 27 has a fixed angle relative to the tool-string longitudinal axis and is attached directly to the leading end of the wireline logging tool-string. The nose section 23 is attached to the terminal end of the base 27. The orientation structure slides over and is attached to the logging tool-string such that the orientation projections are aligned to orient the nose section 23 upwards as the tool-string descends down the wellbore.

The nose section 23 can be implemented in different lengths, thereby altering the height 37 from the bottom of the wellbore to the nose section tip 36. The offset of the nose section tip 36 is pre-set depending on the wellbore size and conditions.

Figure 15:
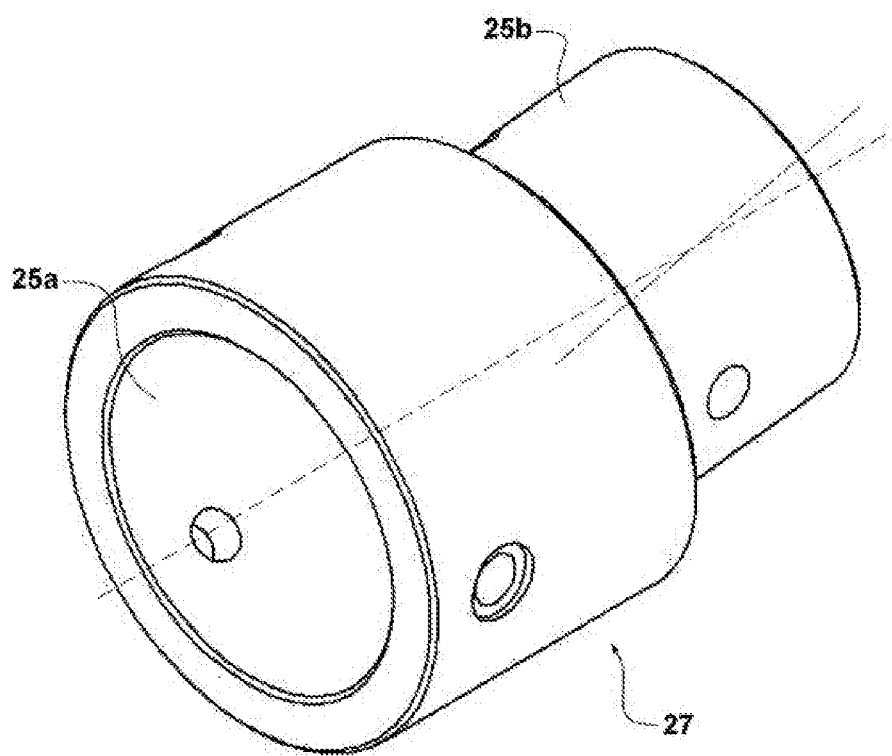
FIG. 15 shows an isometric view of a base for a guide device.

An enlarged view of one embodiment of the base 27 is shown in FIG. 15. The base 27 may be used with some nose sections of the prior art in order to provide improved performance, although those skilled in the art will appreciate that the tool-string will require some type of orientation structure, for example an orientated stand-off, bow spring eccentraliser and/or transportation apparatus as described herein, in order to orientate the nose away from the base of the wellbore.

The base 27 has a first engagement portion 25a for engaging an end of a tool-string, and a second engagement portion 25b for engaging a nose assembly. The engagement portions 25b have centrelines which are angularly offset, such that a nose assembly engaged, in use, with the second engagement portion 25b has a centreline which extends at an angle to the centreline of a tool-string engaged with the first engagement portion 25a, as can be seen in FIG. 13. The offset angle maybe any suitable angle, depending on the length of the nose assembly and the diameter of the wellbore, as is described further below.

In this embodiment the first engagement portion 25a is provided as a collar which fits over a standard boss provided at the end of a tool-string, and the second engagement portion 26b is provided as a hollow boss having standard outer dimensions for engaging a collar provided at the end of a prior art nose assembly. The base 27 is itself hollow, or at least has an aperture therethrough, to allow wiring to be passed through the base 27 if necessary.

Figure 16:
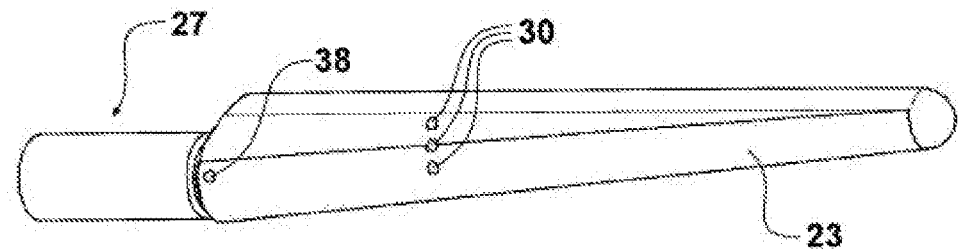
FIG. 16 shows a perspective view of an embodiment of an adjustable guide device set to a 3° angle.
Figure 17:
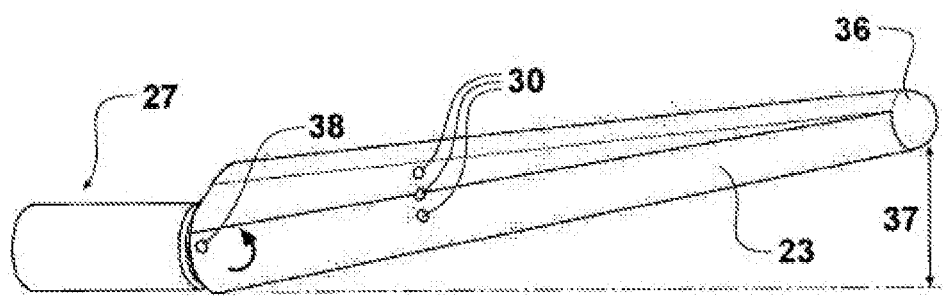
FIG. 17 shows the adjustable guide device of FIG. 16 set to an 8° angle.
Figure 18:
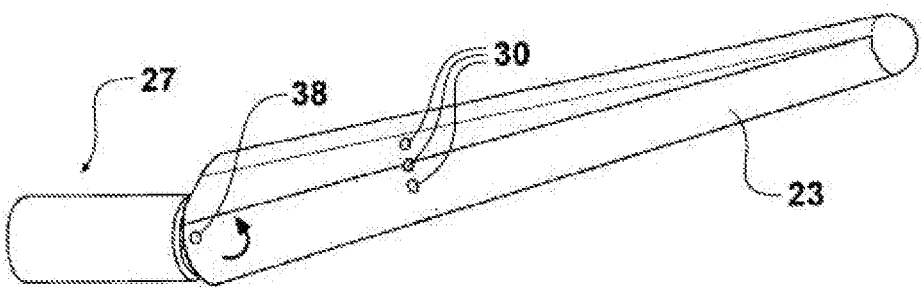
FIG. 18 shows the adjustable guide device of FIG. 16 set to a 15° angle.

FIGS. 16 to 18 show different configurations of angle nose assembly capable of being used in the embodiments shown in FIGS. 28-33. The nose assembly can rotate or pivot about an axle 38 which is engaged to the base 27, so that the angle of the nose assembly can be pre-set to a selected angle before the tool-string is lowered into the wellbore. The base 27 has a locking arm (not shown)

extending inside the nose section 23. The nose section is set at a fixed pre-set angle from the longitudinal tool axis by a locking pin extending through one of three locking points 30 to connect with the locking arm. The nose section pivoting connection 38, combined with the locking point 30, secures the nose section to the base 27 at a fixed angle from the tool-string longitudinal axis. The selection of locking point 30 will determine the offset angle and hence the heights 37 of the nose section tip 36 above the low side of the wellbore.

As can be seen from FIGS. 16-18, each fixed angle setting of the nose assembly 22 provides the nose section 23 with a different offset angle. The offset angle implemented by each nose section 23 increases from 3° in FIG. 16, 8° in FIG. 17 and 15° and FIG. 18. Those skilled in the art will appreciate that the pre-set angle may be adjusted depending on the diameter of the wellbore, the required standoff of the tool-string in the wellbore, and the length of the nose assembly, to locate the end of the nose assembly in a suitable position in the wellbore. Longer nose assemblies will require shallower angles, and shorter nose assemblies will require larger angles, for a given wellbore diameter and standoff distance. The angle is selected such that the tip of the nose section is above the longitudinal axis of the tool-string.

Figure 19:
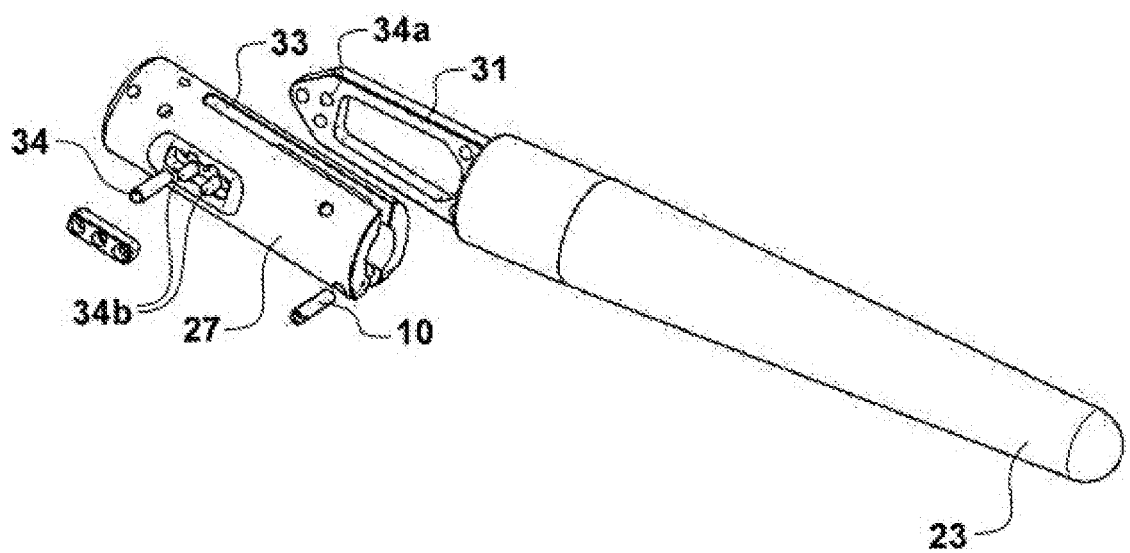
FIG. 19 shows exploded perspective view of another embodiment of an adjustable guide device.

FIG. 19 shows an alternative embodiment of an adjustable nose assembly. In this embodiment the nose section 23 is provided with a locking member 31. A pin or axle 38 extends through apertures in the base 27 and the locking member 31. The base 27 has a vertically orientated longitudinal slot 33 to accommodate the locking member 31.

The end of the locking member 31 is provided with a plurality of locking pin apertures 34a which are parallel to the aperture for the axle 38. Locking pin apertures 34b are also provided in the base 27. The locking pin apertures 34a, 34b are arranged such that one of the apertures 34a in the locking member 31 is aligned with one of the apertures 34b in the base 27 when the nose section 23 is set to one of a predetermined number of angles. The nose section 23 is held at the required angle by inserting a locking pin 34 through apertures 34a, 34b. In a preferred embodiment the apertures 34a, 34b are arranged to allow the nose section to be set to angles of 3 degrees, 6 degrees or 9 degrees to the centreline of the tool-string, although other embodiments may provide angles up to 60°, 45° or 20°. Angles as low as 1° may be used in some embodiments, although often this will require the use of an inconveniently long nose assembly.

FIGS. 20-23 show perspective views of two different types of orientation structure provided in accordance with a yet further embodiment. These figures again illustrate the different forms of orientated stand-off 24 which are to be provided as orientation structures for orienting a tool string or guide device.

These different orientated stand-offs cater for different sizes or diameters of wellbore size. These figures also illustrate different arrangements of orientation projections 8.

Figure 20:
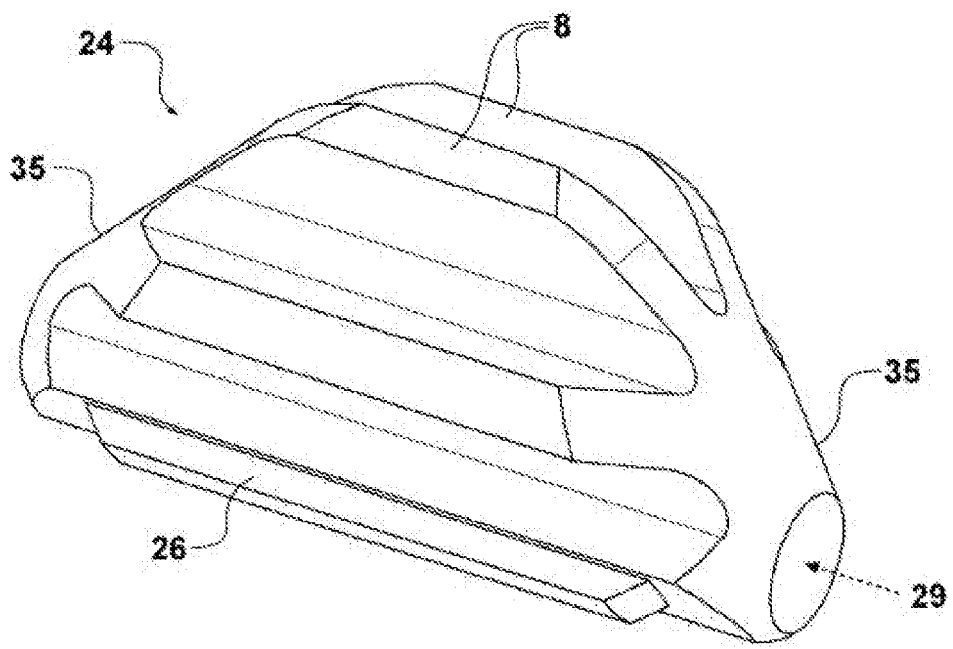
FIG. 20 shows an isometric view of an orientation structure which is provided with low friction skids.
Figure 21:
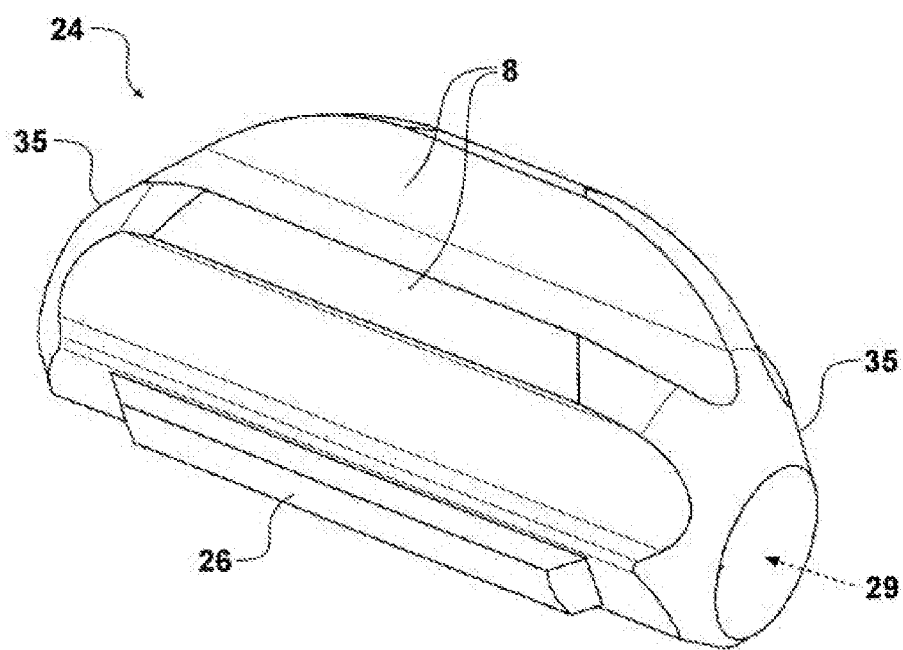
FIG. 21 shows an isometric view of another embodiment of an orientation structure which is provided with low friction skids.
Figure 22:
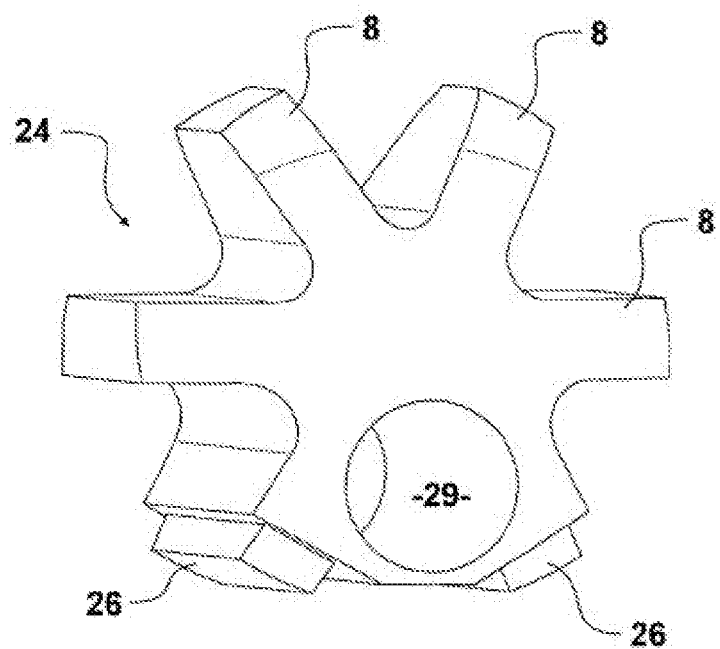
FIG. 22 shows an isometric view of another embodiment of an orientation structure which is provided with low friction skids.
Figure 23:
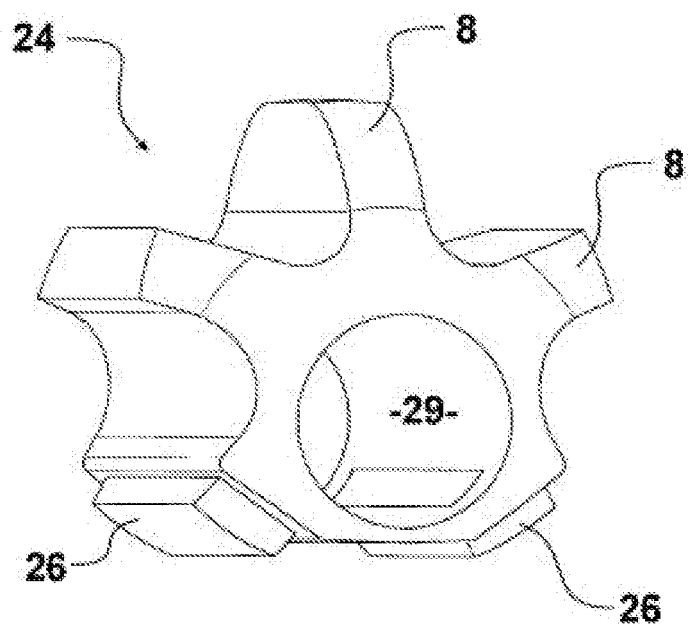
FIG. 23 shows an isometric view of another embodiment of an orientation structure which is provided with low friction skids.

The stand-offs shown in FIG. 20 and FIG. 22 employ a set of four orientation projections 8, while the stand-offs 24 shown in FIGS. 21 and 23 employ three orientation projections only. The orientation projections 8 have tapered extremities 35 to assist in guiding the tool-string around or past obstacles encountered in a wellbore.

The oriented standoffs have a hole 29 passing through the body of the device. This hole is offset from the nominal centre of the standoff. The oriented standoff is designed to slip over a cylindrical wireline logging tool which is then fixed within the hole 29, and below the rotational centre of the stand-offs. The tool-string will therefore be conveyed with a predictable orientation, which in turn will impart an upward orientation or angle to the nose section of the nose assembly.

FIGS. 24-27 show a series of transverse or cross-section views of a number of different implementations of orientation structures. These orientation structures are capable of being used in the embodiments shown with respect to FIGS. 10-19 and 28-30. Identified on these figures is the rotational centre 15 of the orientation structure and the centroid 2a or centre of mass of the tool-string. In the embodiment shown each section of the tool-string has a centre of mass 2a approximately in the middle of the circular section of the tool-string.

These figures also show the form provided through a transverse cross-section of each orientated stand-off made through all of its orientation projections 8 (which in these embodiments also corresponds to the transverse outline). The form provided by this cross section therefore has rotational centre 15. The rotational centre of the oriented standoff is offset from the centroid or centre of mass of the tool-string 2a.

In a deviated wellbore the tool-string will naturally rotate about its longitudinal axis to seek the most stable position. The most stable position is where the tool-string and oriented standoff assembly has the lowest centre of gravity. The lowest centre of gravity is where the tool centroid is below the centre of rotation. In this stable position, the guide device nose section is orientated upwards, the low-friction travel skids of the orientated standoff are in contact with the low side of the wellbore and the logging tool sensors can be optimally orientated to measure the preferred side of the wellbore.

These views show various arrangements of orientated stand-offs with different numbers of orientation projections 8. As can be seen from these figures an orientated stand-off may be implemented with a number of different arrangements of orientation projection. These projections can also be formed with a variety of lengths to accommodate a range of different wellbore diameters.

As can also be seen from the embodiment displayed in these figures, in these embodiments the extremities of each of the orientation projections 8 define sections of the perimeter of a substantially circular curve centred on a point above the centre of gravity of any tool-string engaged with the orientation structure. In the embodiments shown, each of the projections 8 is arrayed at an equal angle to that of its neighbouring projections. However, the travel skids 26 are preferably arranged to have a greater spacing between them than the spacing between the other orientation projections, in order to maximise the stability of the apparatus when it is in its preferred orientation.

FIGS. 28-31 demonstrate the use of the guide device. The figures show the guide device displayed in FIGS. 16-18 and an associated wireline logging tool-string. These figures show a variety of embodiments where an orientation structure 24 or structures are connected to a tool-string 2 at positions remote from a nose assembly 22.

Figure 28:
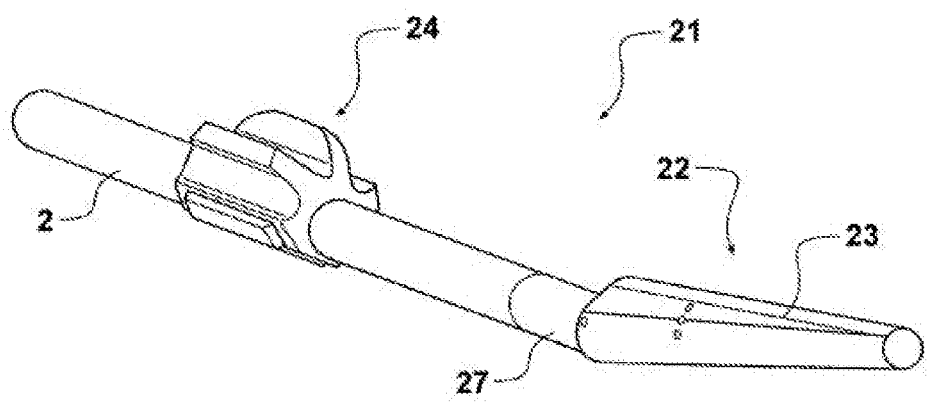
FIG. 28 shows a perspective view of a guide device and orientation structure mounted to a wireline logging tool-string.
Figure 29:
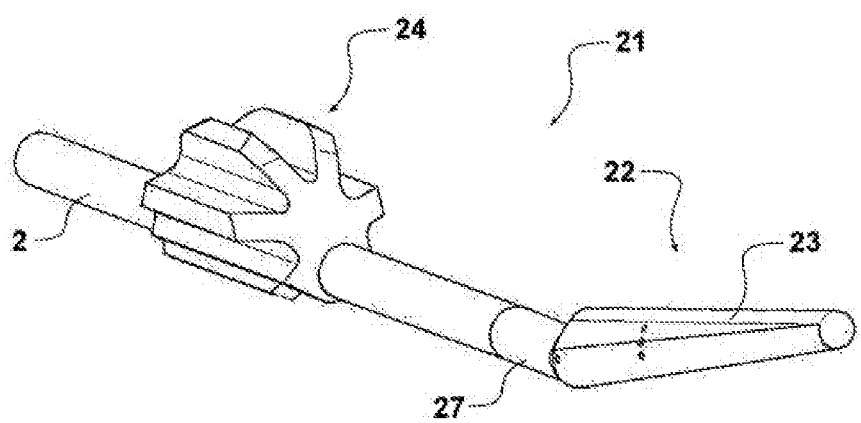
FIG. 29 shows a perspective view of the guide device of FIG. 28 in combination with an alternative orientation structure which is provided with low friction skids, mounted to a wireline logging tool-string.

FIG. 28 illustrates the use of a single orientation structure, shown in this embodiment by an orientated stand-off 24 which is connected some distance away from a nose assembly 22. FIG. 29 illustrates a similar alternative arrangement of orientated stand-off 24 which is arranged to be deployed in a larger diameter wellbore than the stand-off shown with respect to FIG. 28, and hence has the nose 23 set at a larger angle and uses a larger diameter orientation structure.

Figure 30:
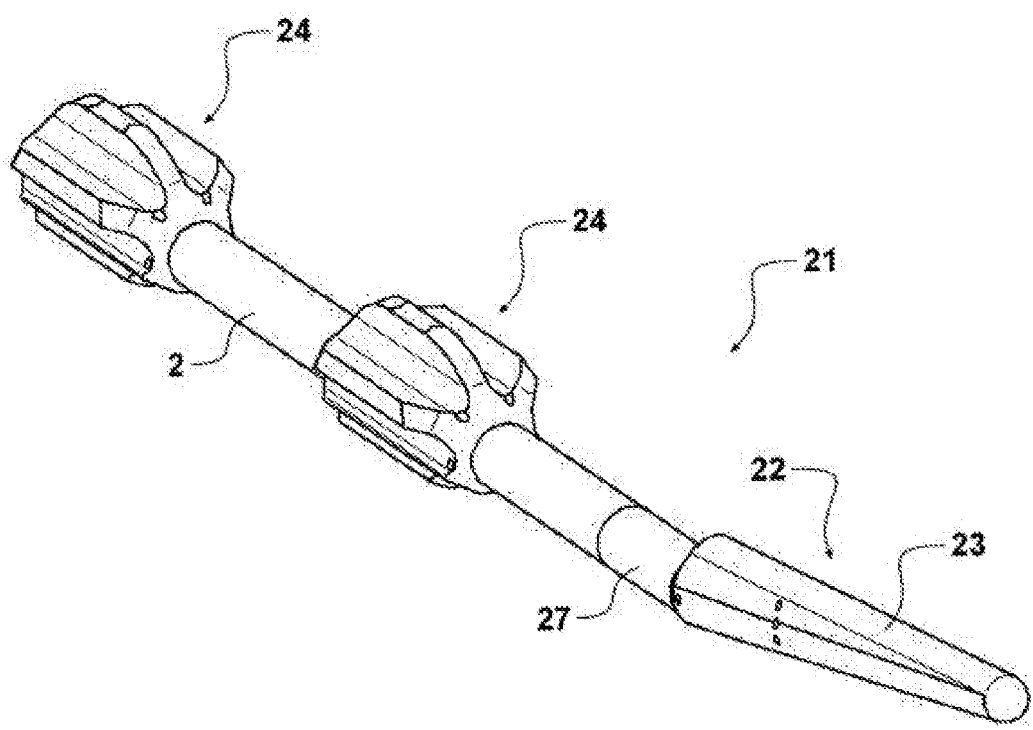
FIG. 30 a perspective view of the guide device of FIG. 28 in combination with two orientation structures which are provided with low friction skids mounted to a wireline logging tool-string.

FIG. 30 shows in a further embodiment which employs a pair of orientated stand-offs 24 located at two different positions along the length of a tool-string 2.

Figure 31:
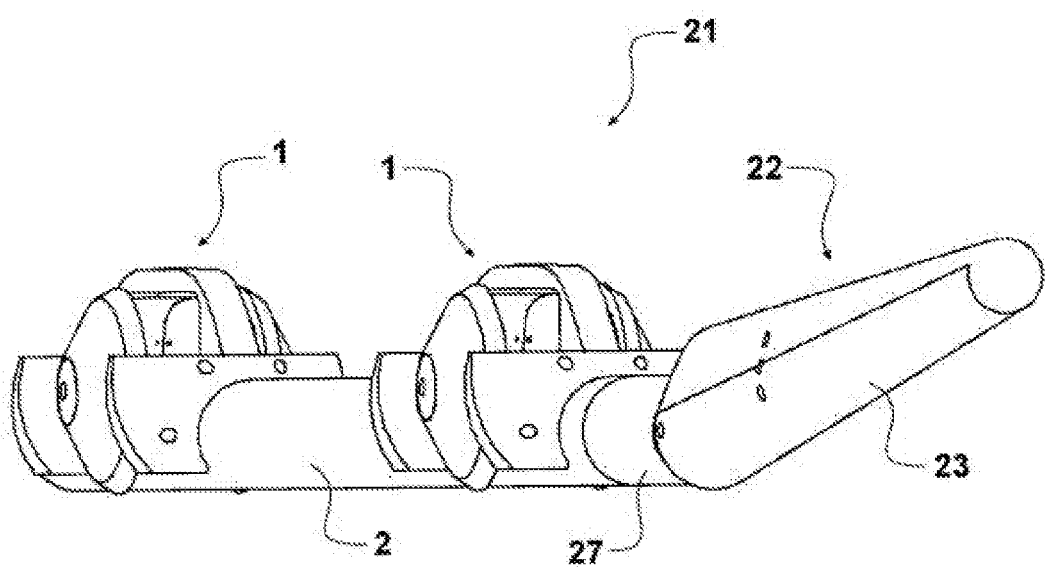
FIG. 31 a perspective view of the guide device of FIG. 28 in combination with transportation apparatus mounted to a wireline logging tool-string.

In the embodiment shown in FIG. 31 a pair of transportation apparatus 1 are used to orientate the guide device 21. The transportation apparatus 1 again act to provide the tool-string 2 with a predictable orientation and to impart an upward inclination to the nose section 23 of the nose assembly 22, as is described above with reference to FIGS. 1-9.

Figure 32:
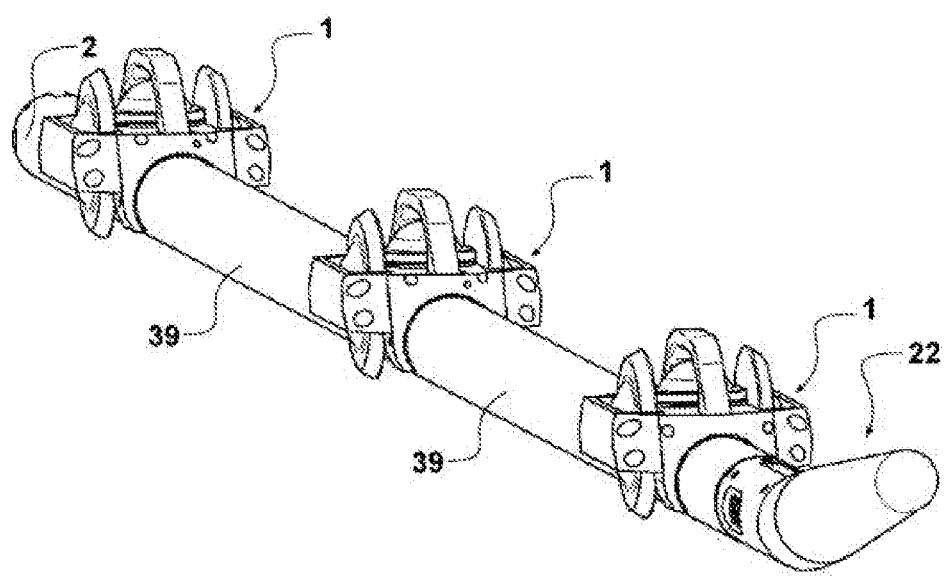
FIG. 32 shows a perspective view of a weight bar attached to a guide device according to FIG. 19 and three transport apparatus according to FIG. 41.

FIG. 32 shows a variation of the system shown in FIG. 31. In this embodiment the transport apparatus 1 are attached to a weight bar 39. The weight bar 39 is attached to a tool-string 2, preferably by a flexible coupling. This allows the transport apparatus 1 and guide device 21 to be used with any type of tool-string, including those with sensors that must be touching the borehole wall, those with irregular profiles, and exceptionally large diameter tools relative to the wellbore diameter. Tools that require lateral movement in the wellbore during operation may also be used, for example sampling tools which move across wellbore when set, and imager tools that are run in hole collapsed and open out to be centralised when deployed.

Figure 33:
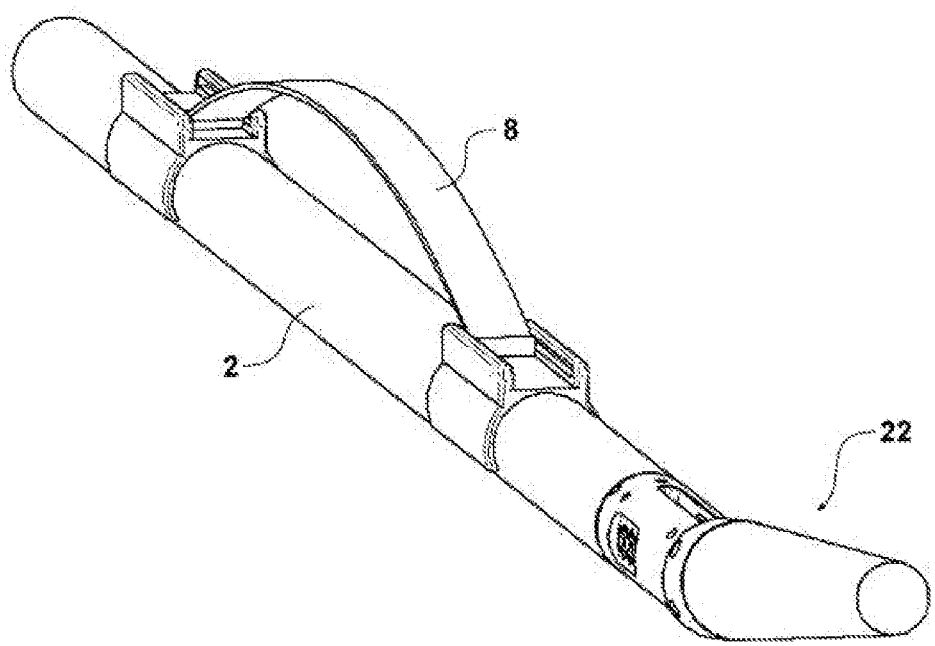
FIG. 33 shows a perspective view of a guide device according to FIG. 19 attached to a wireline tool-string, with a bowspring orientation structure.

FIG. 33 shows another embodiment in which the orientation structure includes the use of a bowspring eccentraliser as an orientation projection 8. Bowspring eccentralisers are well known to those skilled in the art.

Figure 34:
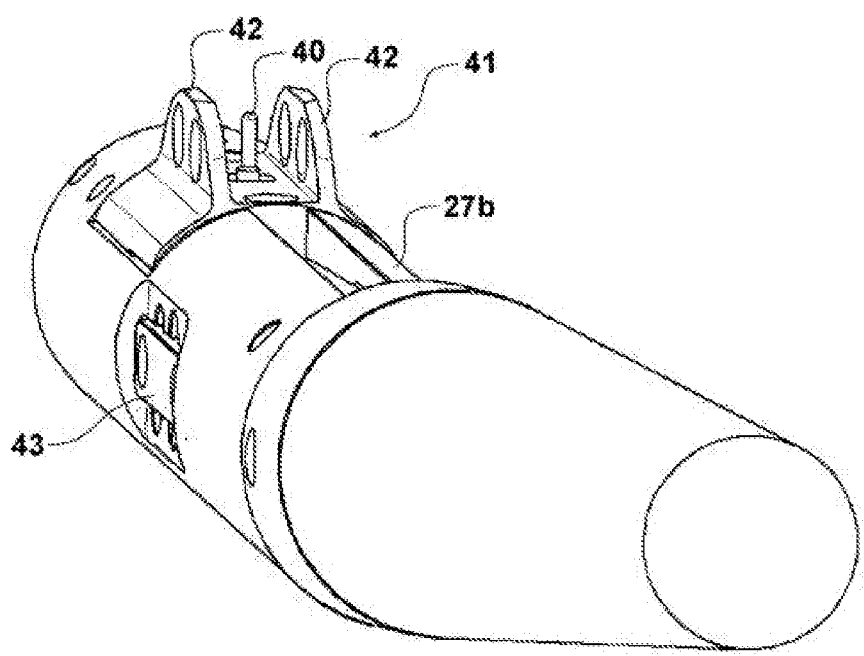
FIG. 34 shows a perspective view of another embodiment of the guide device.

Referring next to FIG. 34, an embodiment of the guide device 21 is shown which has a base 27b which has provision for mounting a temperature sensor 40 and/or other sensor means which require direct contact with the fluid in the wellbore. The base 27b has a guard structure 41 comprising two parallel ribs 42 arranged on either side of the sensor 40, the ribs 42 extending at least as far from the body of the base 27b as the sensor 40. This allows the temperature sensor probe to extend into the central area of the wellbore without risk of damage resulting from contact with the wellbore wall. In this position the temperature sensor assembly is well flushed by the movement of the tool through the wellbore fluids, and is not liable to be so covered with mudcake as to unduly affect response times. To ensure a fast response to temperature changes, preferentially the temperature sensor probe housing is made from a high thermal conductivity, low corrosion material such as low Beryllium Copper alloy, silver or gold. The temperature sensor probe is preferably thermally insulated from the base and body of the guide device 21.

By positioning the probe at the end of the nose of the tool-string the probe measures wellbore temperature before that temperature is influenced by the temperate of the tool-string itself, and mixing of well fluids caused by the tool-string movement.

A pressure sensor may also be provided (additionally or alternatively to the temperature sensor). The provision of a pressure sensor which does not become clogged with mudcake or other debris allows the change of depth of the tool to be monitored. In this way the operator can ensure that the tool-string is proceeding into the wellbore at a rate which is consistent with the rate at which the cable feed is operating. Feeding cable at too high a rate can result in the cable becoming tangled and the tool-string becoming difficult to remove from the wellbore.

The sensor 40 is positioned so as to be behind the upwardly angled nose section 23. Because the orientation structures keep the nose section 23 angled upward, and the nose section 23 is held at a fixed angle when in use, the sensor 40 does not come into contact with the sides of the wellbore, and is shielded by the nose section 23 from any steps or shelves in the wellbore walls. In the embodiment shown the guide device 21 is provided with the pre-set angle adjustment system described above with reference to FIG. 19, and shows the cover plate 43 which is used to retain the locking pin 34.

Figure 35:
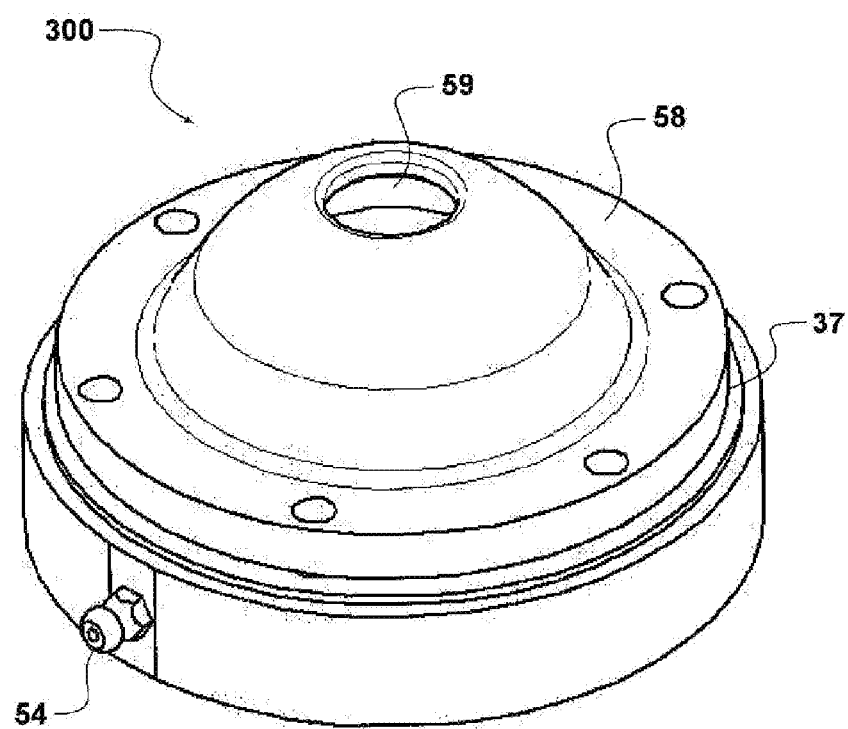
FIG. 35 shows a perspective view of a lubrication delivery apparatus.
Figure 36:
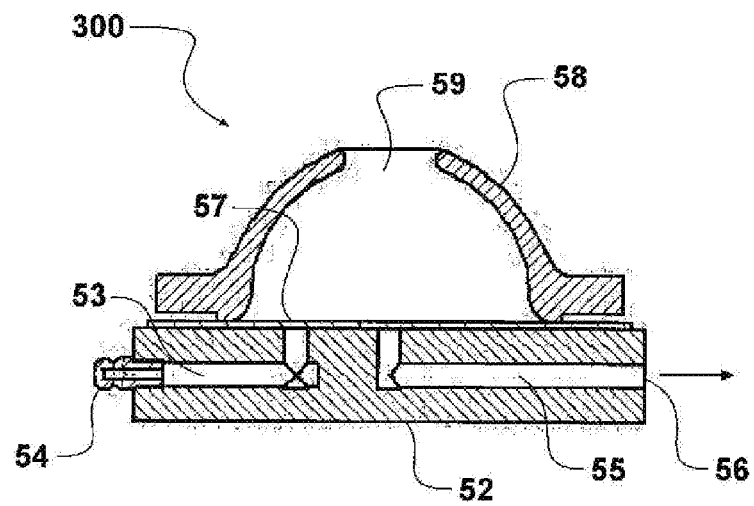
FIG. 36 shows a side cross-section view of the lubrication delivery apparatus of FIG. 35 prior to charging with lubricant.
Figure 37:
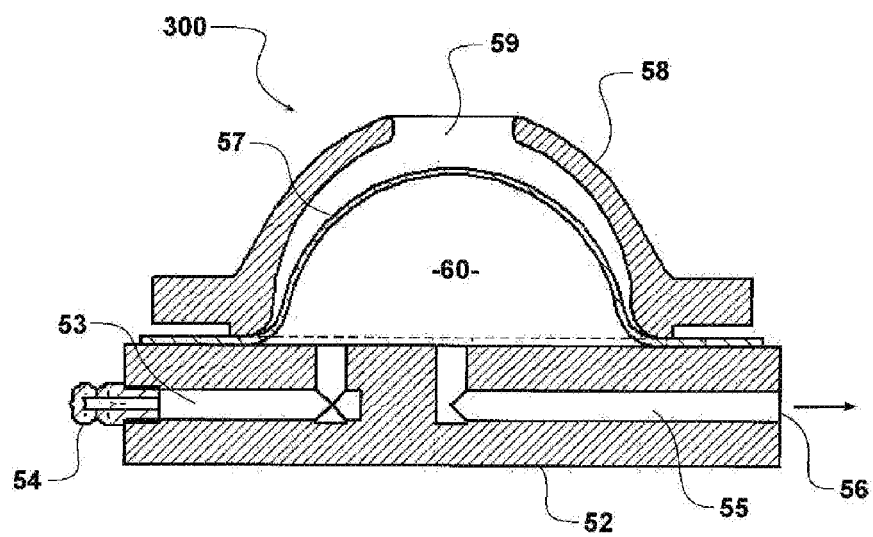
FIG. 37 shows a side cross-section view of the lubrication delivery apparatus of FIG. 35 after charging with lubricant

Referring next to FIGS. 35-37, a lubrication delivery apparatus which is suitable for use with the transportation apparatus 1 is generally referenced by arrow 300.

The apparatus 300 is formed from a base structure, provided in this embodiment by a block element 52. An inlet channel 53 is formed within the interior of the block element, as is an outlet channel 55. The inlet channel 53 terminates in an inlet port, formed in this embodiment by a grease nipple or valve 54. The outlet channel 55 leads to an outlet port 56 which allows for the free flow of lubricant, typically grease, from the apparatus 300.

The apparatus 300 has an elastic diaphragm 37 which covers most of the upper flat surface of the base structure 52. The diaphragm 57 is connected to and sealed against the base by a substantially rigid protective housing 58. The housing 58 also includes a port 59 to allow ambient pressure to act on the exterior side of the elastic diaphragm. The port also provides an opening for inspection of the diaphragm 57.

As can be seen from FIG. 37, a reservoir 60 is formed between the interior surface of the diaphragm 57 and the surface of the base which it covers. FIG. 36 shows the arrangement of the apparatus prior to this reservoir being filled with lubricant.

To charge or fill the reservoir 60, a suitable flowable lubricant, typically grease, is forced into the reservoir 60 through the grease nipple or valve 54 via a grease gun, oil pump or similar. The injected lubricant stretches the elastic diaphragm 57. The tension induced in the elastic diaphragm 57 due to this stretching, results in the lubricant in the reservoir 60 being maintained at a pressure higher than the ambient pressure acting on the exterior side of the elastic diaphragm 57.

FIG. 37 shows the apparatus after the reservoir 60 is charged or filled with lubricant injected through the grease nipple or valve 54 and inlet channel 53. The lubricant is pressurised in the reservoir by the stretched elastic diaphragm 57. In this embodiment the elastic diaphragm has been stretched to twice its original area (elongation 100%). The lubricant is delivered from the pressurised reservoir 60 to the mechanical system via outlet channel 55 and outlet port 56.

In the embodiment shown the diaphragm 57 is formed from silicone rubber, allowing it to be deformed and expanded to accommodate the pressurised lubricant pumped into the reservoir 60. The elastic nature of the diaphragm allows it to store elastic potential energy imparted by the pressurised lubricant supply to maintain the pressure of lubricant held within the reservoir. This stored energy is slowly released by the diaphragm pushing lubricant out through the outlet channel 55 and outlet port 56 to lubricate a further mechanical system (not shown) to be deployed and an underground wellbore. One example of a mechanical system which can be lubricated is a bearing assembly, as is described further below.

The tension in the elastic diaphragm 57 maintains the lubricant at an incremental pressure over and above the ambient pressure acting on the exterior surface of the elastic diaphragm 57. This over pressurisation of lubricant by the apparatus 300 provides a supply of lubricant to the mechanical system being lubricated and also prevents the entry of contaminants from the wellbore into the mechanical system being lubricated.

In a variety of additional embodiments the flow of lubricant through the mechanical system may be controlled by a metering valve. The flow of lubricant may alternatively be limited by an oil or grease seal on the exit of the mechanical system. The mechanical system may also incorporate a bush bearing where flow of lubricant is limited by the close fit the bearing.

Figure 38:
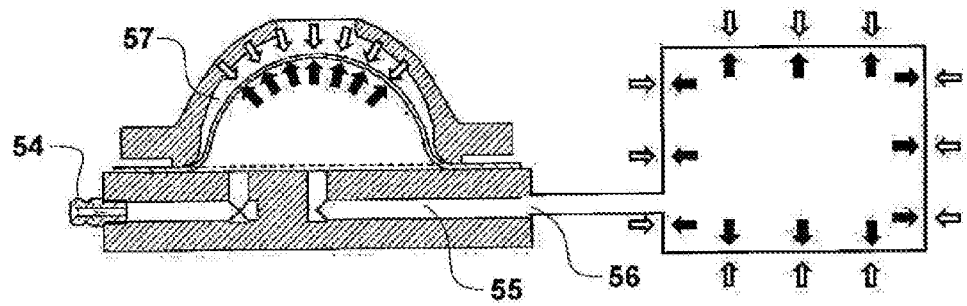
FIG. 38 illustrates the pressures experienced by the lubrication delivery apparatus of FIGS. 35, 36 and 37 when used in a particular instance.

In the example shown in FIG. 38 the ambient pressure (P) act on the exterior surface of the diaphragm 57 may be 14.7 psia. The additional pressure ($\delta$P) exerted on the lubricant by the stretched elastomer diaphragm 57 may be 3 psia. Hence the lubricant reservoir pressure is 17.7 psia. Thus the pressure within the lubricated system is 3 psi higher than its surroundings.

An imperfect seal between the mechanical system which is supplied with lubricant by the apparatus 300 and its surroundings will result in lubricant leaking out to the ambient surroundings. The constant flow of lubricant out of the mechanical system prevents contaminants from entering the mechanical system. When the device is operating in a wellbore at 4000 m below surface, the ambient pressure may be in the order of 6000 psia. The stretched elastomer diaphragm 57 will still exert an additional 3 psi pressure on the lubricant and hence the lubricant pressure is 6003 psia. Pressure within the mechanical system is now 6003 psi, 3 psi above the surroundings, hence the mechanical system is protected from the entry of contaminants.

As the depth changes in the wellbore, so too does the ambient hydrostatic pressure. Unlike a spring/piston type system, the elastomer diaphragm has no sliding parts and is able to instantaneously adjust to small changes in ambient pressure, in this example, keeping lubricant pressure at 3 psi above the surroundings. Because there are no sliding parts, and no friction inherent in the system, it will be effective at preventing contaminants entering the mechanical system even at very small differential pressure ($\delta$P) from the stretched elastomer diaphragm.

Figure 39:
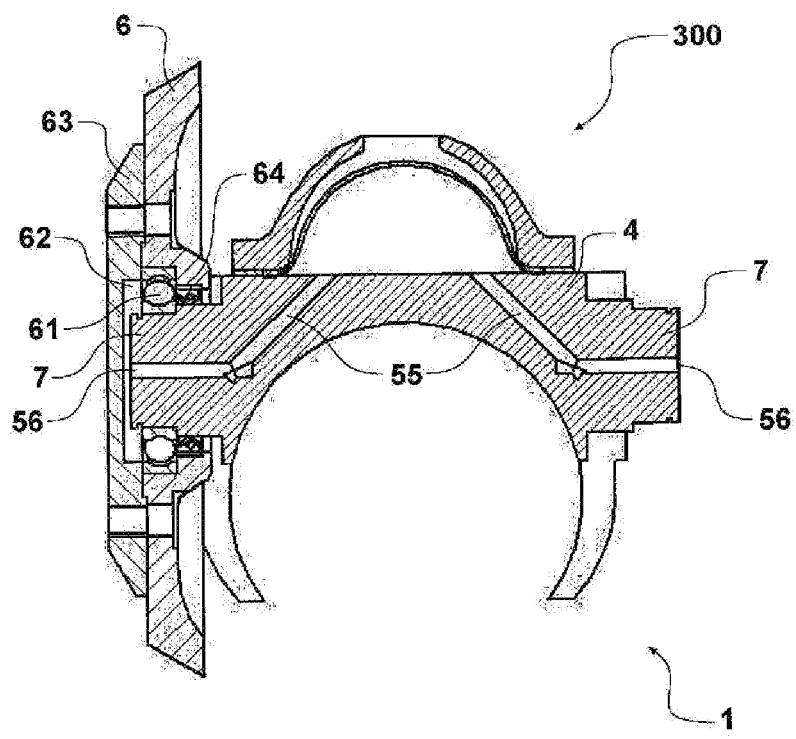
FIG. 39 shows a transverse cross-section of a transportation apparatus with an integral lubrication delivery apparatus, with one ball bearing assembly mounted wheel shown and the opposite wheel and bearing removed.
Figure 40:
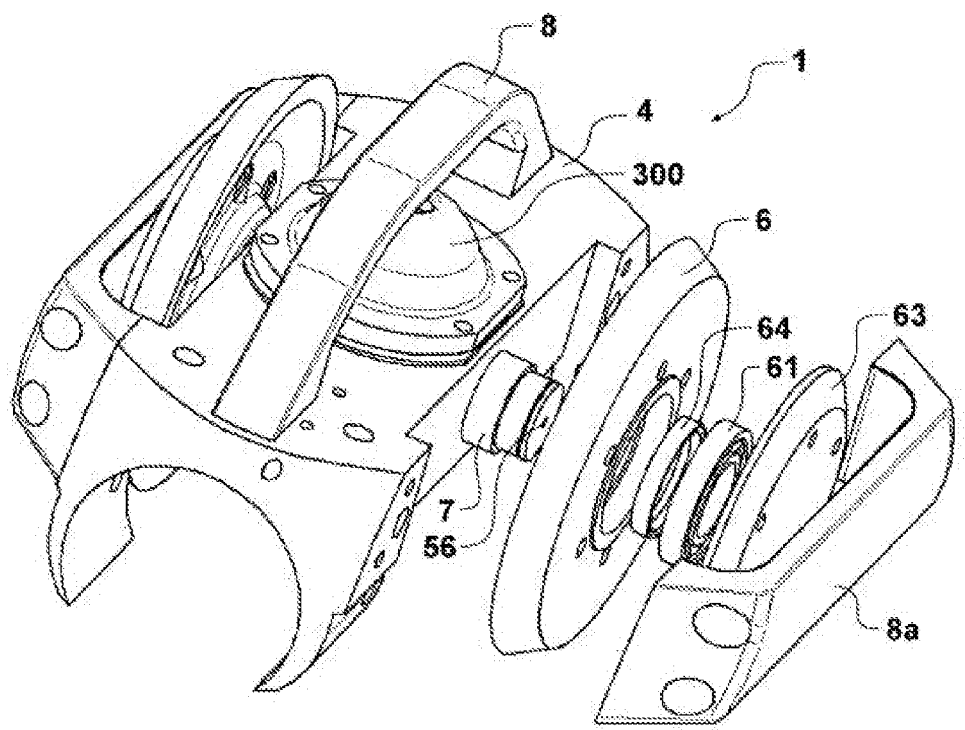
FIG. 40 shows a perspective view of the transportation apparatus of FIG. 39 with the opposite wheel and bearing shown in partially exploded form.
Figure 41:
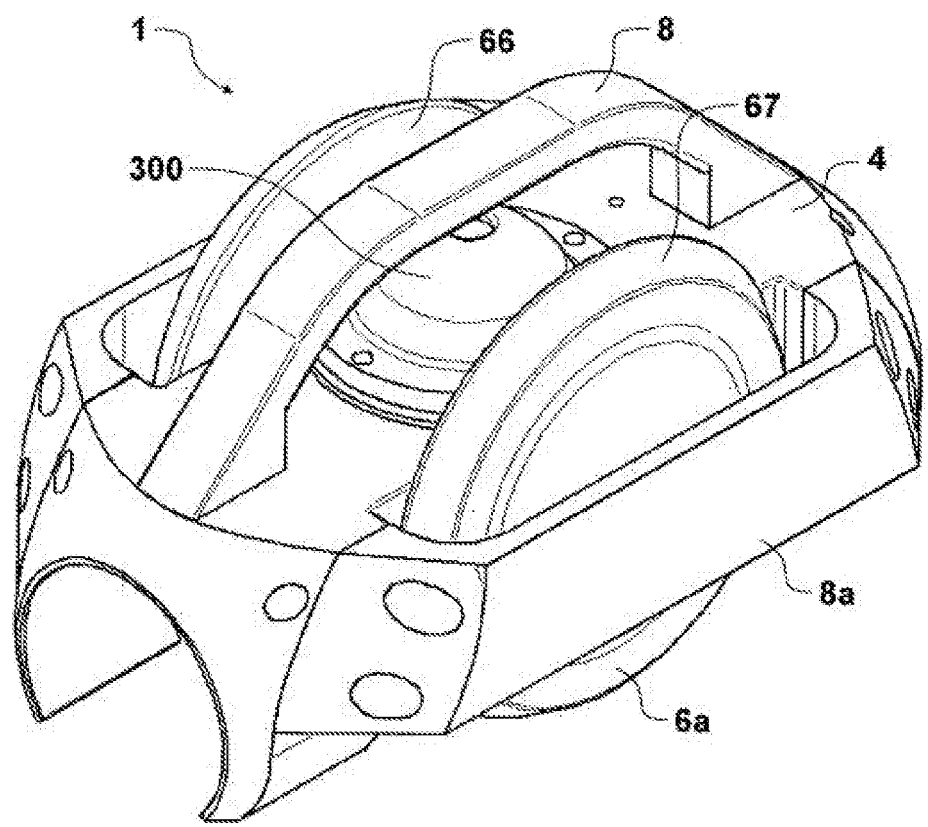
FIG. 41 shows a perspective view of the transportation apparatus in another embodiment.

FIGS. 39 to 41 show a transportation apparatus which is provided with an alternative implementation of the lubrication delivery apparatus 300. The lubrication apparatus shown in the embodiment of FIGS. 39-41 is equivalent to that discussed above with respect FIGS. 35-38 other than for the inclusion of a pair of outlets channels and ports as discussed below, and performs the function of the pressurised lubrication system 9 described above with reference to FIGS. 4 and 5.

In the embodiment shown with respect to FIGS. 39-41, the base structure of the lubrication delivery apparatus 300 is formed by a portion of the body of the transportation apparatus 1. As in the previously described embodiment, the base structure effectively forms a block like element which defines within its interior a pair of outlet channels 55 terminating in output ports 56. These outlet ports 56 are used to deliver lubricant to the bearings 61 of the transportation apparatus 1, as shown in FIGS. 39 and 40.

As best seen in FIG. 39, each outlet port 56 feeds a chamber 62 formed between the end of the stub axle 7 and a cover 63 which is attached to the outer surface of the wheel 63. The chamber 62 extends to the open side of the bearing 61, thereby allowing pressurised lubricant to flow into the bearing 61.

A suitable lubricant seal 64 is provided on the inner side of the bearing 61. This arrangement allows the use of commercially available deep groove ball bearing assemblies 61 in the wellbore environment, the constant positive pressure on the inside of the oil/grease seal 64 ensuring that no water or other contaminants can penetrate the oil/grease seal 64.

The transportation apparatus shown in FIGS. 40 and 41 is provided with a protection structure in the form of removable orientation projections 8a which extend around an exterior surface 6a of the wheels 6, as described above with reference to FIGS. 8 and 9. These orientation projections 8a extend substantially longitudinally from in front of each wheel to behind the wheel, and are shaped to assist in preventing material from clogging the space between the inside surface of the wheel 6b and the exterior of the main body, and support the outer ends of the stub axles 7 on which the wheels 6 are mounted, as is described above. As can be seen in these figures, the wheels 6 extend above and below the longitudinally extending orientation projection 8a. The longitudinally extending orientation projection 8a is preferably relatively slender, for example having a height which is greater than the diameter of the axle on which the wheel is mounted, but less than the radius of the wheel. As is best seen in FIG. 41, a clearance space is provided between the radially extreme edge or surface 67 of the wheel (relative to the axis of rotation) and the longitudinal orientation projection 8a, although the profile of the wheel may mean that the clearance is reduced towards the centre of the wheel.

This clearance, along with the slender aspect of the protection structure, assists in preventing the area inside the protection structure from becoming clogged with debris from the wellbore surface. In a preferred embodiment there is a clearance of at least 4 mm between radially extreme surface 67 of the wheel (that is, the surface of the wheel which is normally in contact with the wellbore wall) and the exterior of the main body, and at least 4 mm clearance between the radially extreme edge of the wheel and the interior of the protection structure. In the embodiment show the interior of the protection structure has a clearance of at least 15 mm, more preferably at least 19 mm.

The longitudinally orientated orientation projection preferably has a central axis which is substantially coincident with the rotational axis of the wheel.

Figure 42:
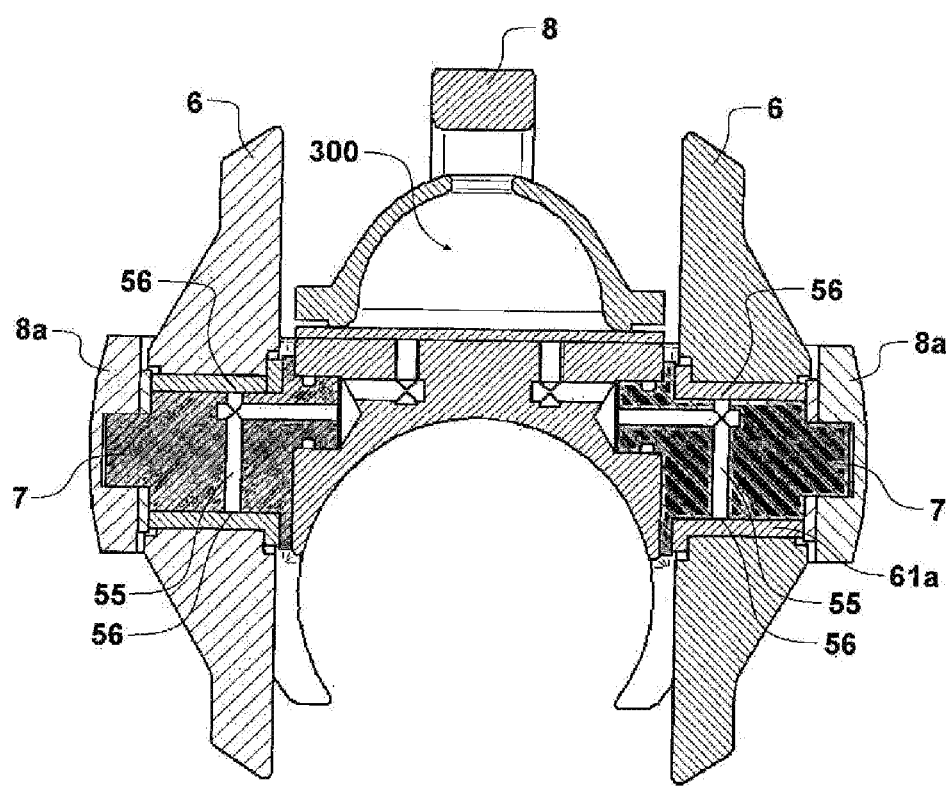
FIG. 42 shows a transverse cross-section of the transportation apparatus of FIG. 41 provided with a modified lubrication delivery system, plain bearings and separate stub axles.

FIG. 42 shows another embodiment of a transportation apparatus 1 with a modified lubrication delivery apparatus. In the embodiment shown the transportation apparatus 1 uses plain bearings with a flanged bush bearing member 61a. The lubrication apparatus 300 has two outlet channels and at least four outlet ports 56. No lubricant seal is required for this embodiment.

In this embodiment the stub axles 7 are formed as separate components to the body (in contrast to the embodiments shown in FIGS. 4 and 5 wherein the stub axles are integrally formed with the body). However, the channels 55 still run through each stub axle.

In a preferred embodiment the arrangement of the bearings is such that some pressurised lubricant is able to escape past the bearings. This constant, but controlled, escape of lubricant acts to transport debris and contaminants away from the bearings.

The stub axles 7 are supported by the longitudinally extending orientation projections 8a.

Figure 43:
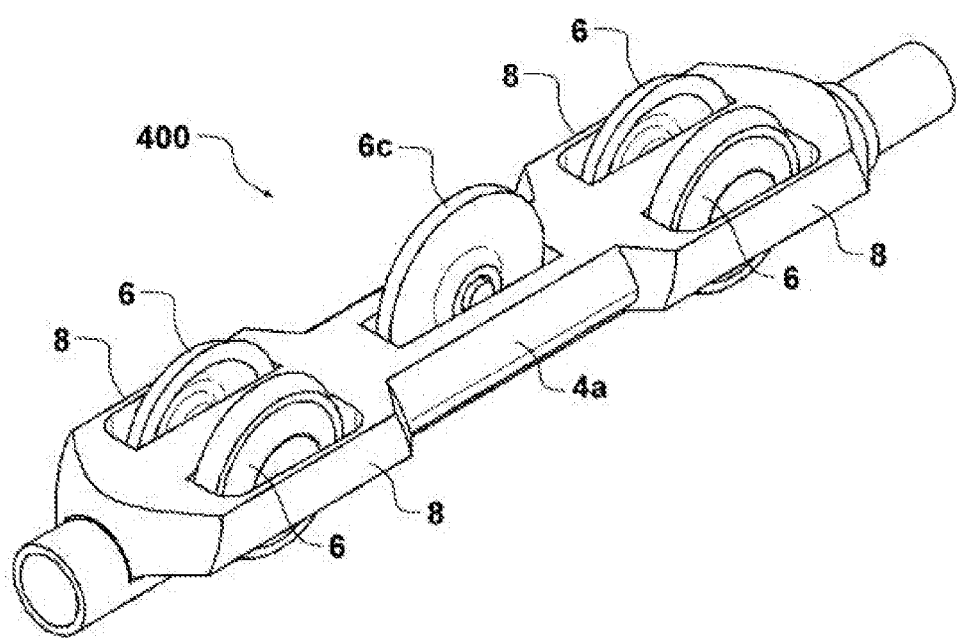
FIG. 43 shows an isometric view of a transport apparatus configured as a tractor unit, with the jockey wheel in a raised position.
Figure 44:
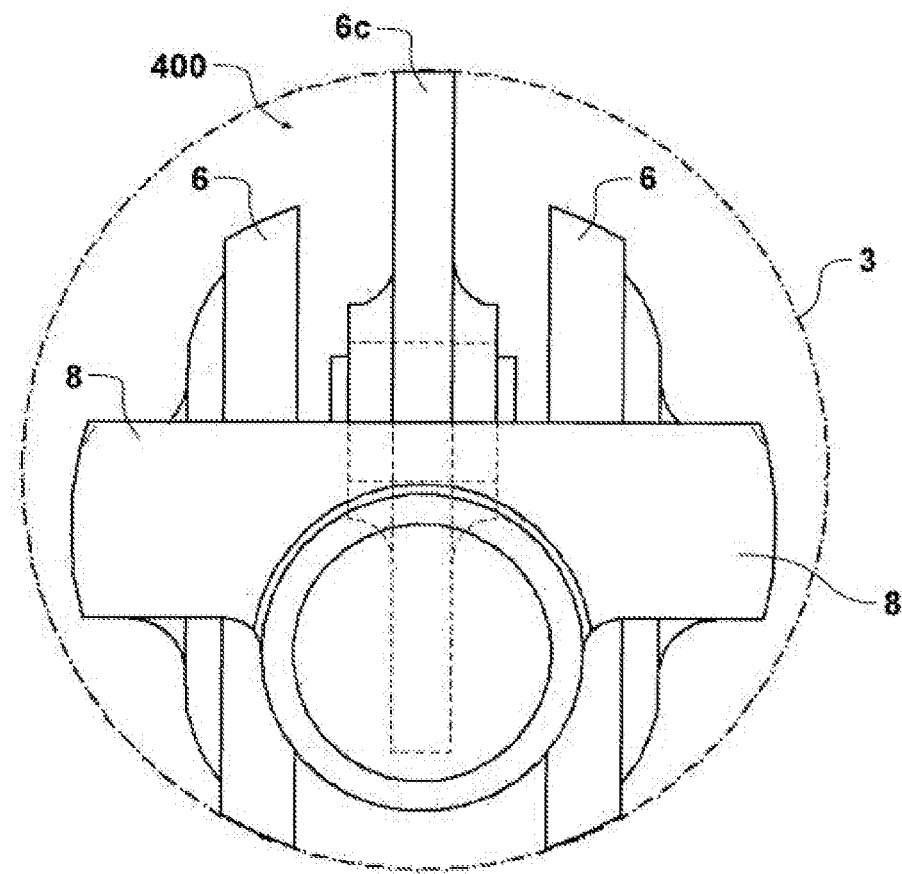
FIG. 44 shows a front view of the tractor unit of FIG. 43 in use in a wellbore, with a lower portion of the jockey wheel shown in hidden detail.
Figure 45:
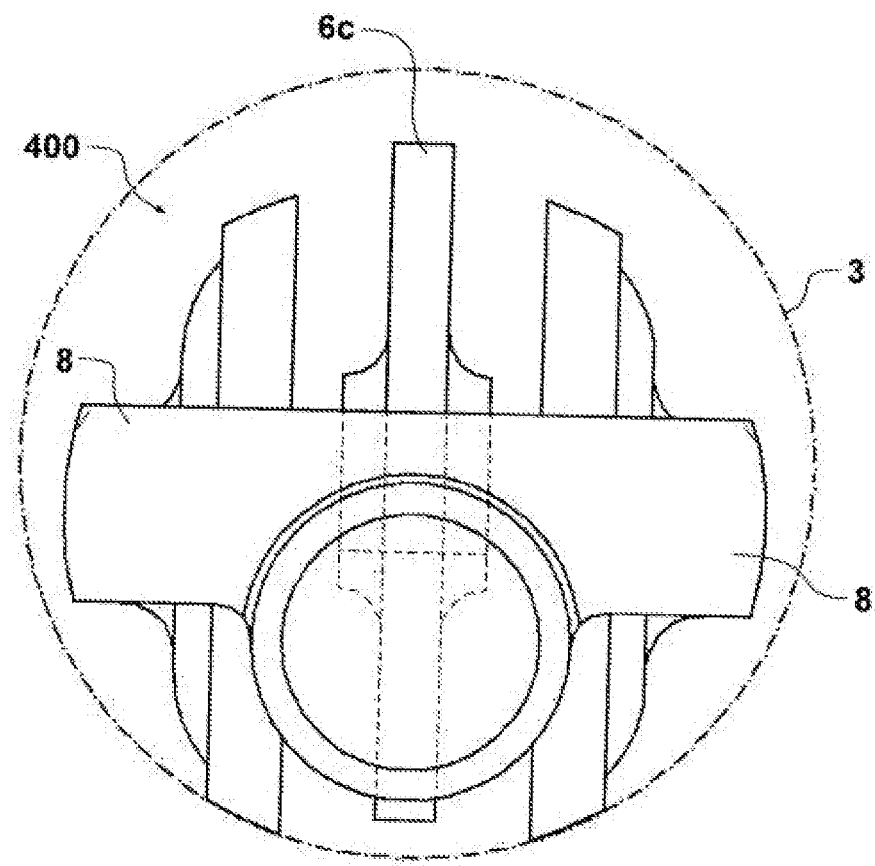
FIG. 45 shows a front view of the tractor unit of FIG. 43 in use in a wellbore with the jockey wheel in a lowered position, and with a lower portion of the jockey wheel shown in hidden detail.

FIGS. 43 to 45 show another embodiment of the transportation apparatus, in this embodiment configured as a tractor unit.

The tractor unit 400 comprises a transportation apparatus with a plurality of main wheels 6, in this case four main wheels 6, and at least one jockey wheel 6c. The tractor unit preferably comprises an orientation structure having at least two orientation projections. Those skilled in the art will appreciate that the jockey wheel 6*c* also functions as an orientation projection.

The jockey wheel 6*c* is preferably mounted to an adjustable mounting means (not shown) for raising and lowering the jockey wheel relative to the main body 4*a*. One or more of the main wheels 6, and preferably each of the main wheels 6, are connectable to a drive means, typically one or more electric motors. In a preferred embodiment the main wheels 6 are provided with clutch means (not shown) which can disengage the main wheels 6 from the drive means to allow the main wheels 6 to freewheel when the borehole is sufficiently steep.

In use, one or more tractor units 400 are connected in line with the tool-string. The tool-string and tractor 400 can free-wheel down the wellbore until the tool-string can no longer descend under gravity alone. At this point the jockey wheel 6*c* is raised and extends upward to make contact with the top of the wellbore wall 3 (best seen in FIG. 44) thereby increasing contact pressure on the driven wheels 6. The clutch is engaged and the main wheels 6 are driven by the drive means. In this way the tool-string can be transported along wellbores at very high deviation angles, up to and including substantially horizontal wellbores. The tractor unit is preferably provided with a guide device 21 as described above. One or more transportation means 1 may also be used as required to assist in transporting the tool-string.

Figure 46:
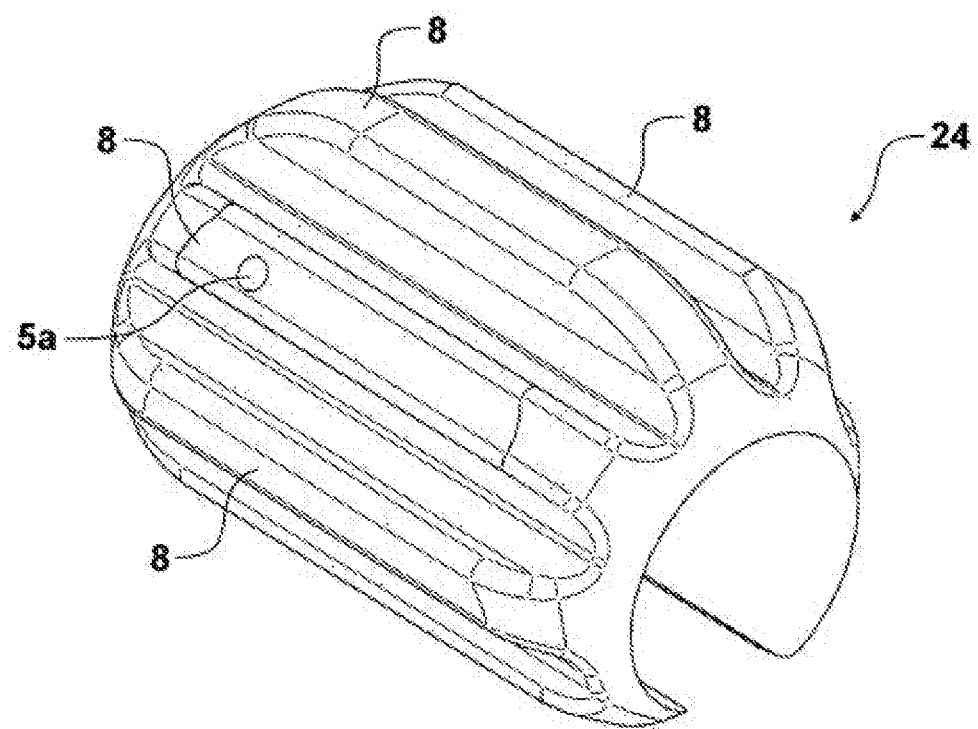
FIG. 46 shows a perspective view of another embodiment of an orientation structure.

FIG. 46 shows another embodiment of an orientation structure which is provided as an orientated standoff 24, similar to those shown in FIGS. 20 and 21. In the embodiment shown in FIG. 46, the engagement between the standoff 24 and the tool-string is similar to that used with the transportation apparatus described above with respect to FIGS. 1-3. The engagement structure 5 is in the form of a locking collar. The collar 5 is arranged to partially enclose the exterior side wall surface of the tool-string 2, allowing the standoff to be slid on and over the tool-string at any desired position along the length of the tool-string. Each collar includes a series of threaded holes 5*a* arranged to receive a screw which engages with a recess or blind hole in the exterior surface of the tool-string. These threaded holes 5*a* and an associated set of screws are used to lock the apparatus 1 to the tool-string 2 with a specific orientation. By arranging the collars 5 to only partially enclose the tool-string 2, the tool-string can be carried in a lower position than would be possible if the collars 5 were to completely encircle the circumference of the tool-string 2, and allows an increased clear space 65 (preferably at least 10 mm, more preferably at least ½ inch) between the lower orientation projections 8, which in this embodiment comprise low friction skids, This clear space allows the cutting debris which has collected on the bottom surface of the bore to pass under the tool-string 2. As with the other orientation structures described above, the structure shown in FIG. 46 has a centre of rotation which is offset from the centroid of the tool-string 2.

Figure 47:
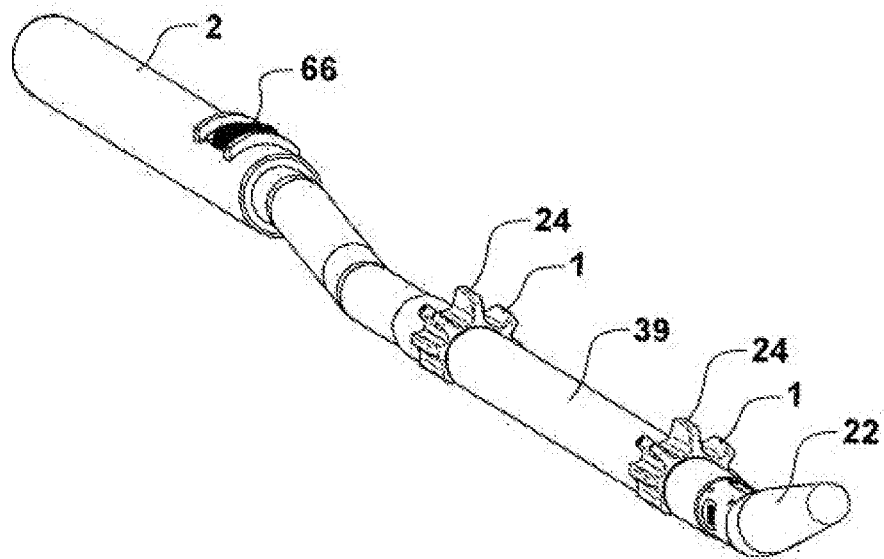
FIG. 47 shows a perspective view of a guide device and orientation structure mounted to a wireline logging tool-string which has a sampling tool on its upper surface.
Figure 48:
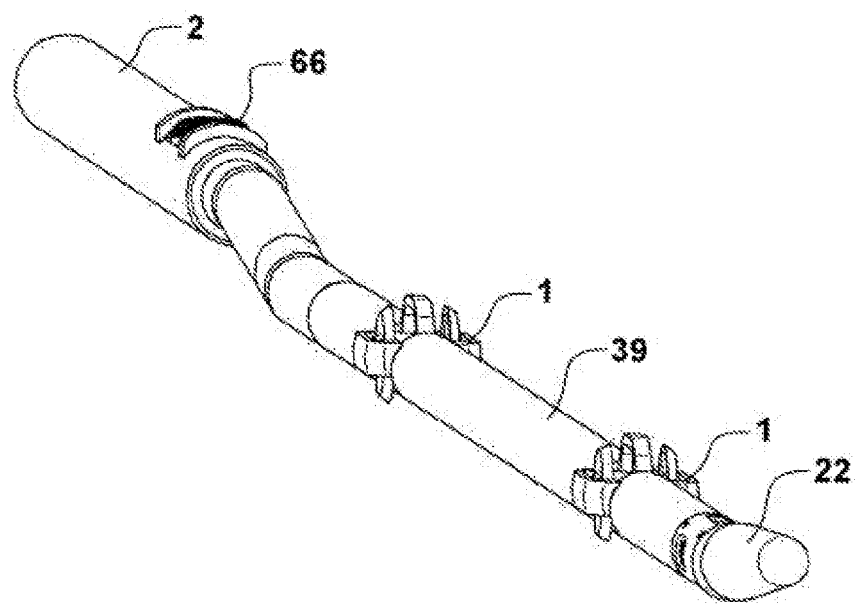
FIG. 48 shows the same wireline logging tool-string as FIG. 48, but with wheeled transportation providing the orientation.

FIGS. 47 and 48 show a variant of the system shown in FIG. 32. In this embodiment the tool-string is provided with a prior art sampling tool 66 for taking samples and pressure measurements. Because the tool-string 2 is connected to at least one orientation structure, whether an orientated standoff 24 or a transportation apparatus 1, the sampling tool can be orientated to take its sample from the high side of the wellbore. This has the advantage that the high side of the wellbore tends to be less damaged by the grinding action of the drillpipe as it rotates and reciprocates during the drilling operation. This damage can affect the porosity and permeability of the wellbore wall in particular, and can lead to unrepresentative measurements, or at least delays in obtaining representative measurements. By using the apparatus shown, this sampling process is improved.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the spirit or scope of the appended claims.

The invention claimed is:

1. A sensor transportation apparatus to convey an elongate sensor assembly through a wellbore, the sensor transportation apparatus comprising:
   at least one engagement structure to connect the sensor transportation apparatus to the sensor assembly, and
   a pair of wheels arranged to rotate about an axis of rotation substantially perpendicular to a longitudinal axis of the sensor assembly when the transportation apparatus is connected to the sensor assembly, and
   an orientation structure comprising at least one orientation projection, in a transverse outline of the sensor transportation apparatus a said orientation projection extending between the pair of wheels so that the shortest distance between a centre of mass of the elongate sensor assembly and the wellbore wall is when the pair of wheels are in contact with the wellbore wall and the sensor transportation apparatus has a single most stable orientation within the wellbore, in the single most stable orientation the sensor transportation apparatus oriented on the pair of wheels with the axis of rotation of the pair of wheels horizontal and with the elongate sensor assembly closest to the low side of the wellbore wall.

2. The sensor transportation apparatus as claimed in claim 1, wherein the orientation structure defines a form having a transverse outline which has a rotational centre, wherein the rotational centre is offset from the centre of mass of the elongate sensor assembly so that, in use, the sensor transportation apparatus is oriented in a most stable position with the centre of mass of the elongate sensor assembly below the rotational centre and with the pair of wheels in contact with the wellbore wall.

3. The sensor transportation apparatus as claimed in claim 1, wherein the orientation structure is configured to orient the sensor transportation apparatus in a most stable position with the pair of wheels in contact with a low side of the wellbore wall on an opposite side of the sensor transportation apparatus to the at least one orientation projection.

4. The sensor transportation apparatus as claimed in claim 1, wherein each wheel has a diameter substantially greater than one of the diameter, width or height of the elongate sensor assembly.

5. The sensor transportation apparatus as claimed in claim 1, wherein lateral extremities of the orientation structure substantially lie on a substantially circular curve.

6. The sensor transportation apparatus as claimed in claim 2, wherein lateral extremities of the orientation structure substantially lie on a substantially circular curve which is centered at the rotational centre.

7. The sensor transportation apparatus as claimed in claim 1, wherein in use, the axis of rotation of the pair of wheels is above the centre of mass of the elongate sensor assembly when the axis of rotation is substantially horizontal.

8. The sensor transportation apparatus as claimed in claim 1, wherein the orientation structure comprises the pair of wheels.

9. The sensor transportation apparatus as claimed in claim 2, wherein the orientation structure comprises the pair of wheels, and wherein a lateral extremity of the at least one orientation projection and bottom radial extreme edges of the pair of wheels lie on a circular curve with the centre of the curve at the rotational centre.

10. The sensor transportation apparatus as claimed in claim 9, wherein the lateral extremity of the at least one orientation projection and top and bottom radial extreme edges of the pair of wheels lie on the circular curve with the centre of the curve at the rotational centre.

11. The sensor transportation apparatus as claimed in claim 1, wherein the wheels run on bearings and the apparatus further comprises a lubrication delivery apparatus configured to provide a lubricant to the bearings at a pressure which is greater than ambient wellbore pressure, the lubrication delivery apparatus comprising a lubrication reservoir with an elastic diaphragm, wherein an exterior side of the elastic diaphragm is subject to ambient pressure.

12. The sensor transportation apparatus as claimed in claim 1, wherein the engagement structure is adapted to engage an exterior surface of the elongate sensor assembly or is adapted for in-line connection to the elongate sensor assembly.

13. The sensor transportation apparatus as claimed in claim 1, further comprising a guide device, the guide device comprising: a base adapted to engage an end of the elongate sensor assembly and a nose section having a tip which is offset from the longitudinal axis of the elongate sensor assembly when the guide device is engaged with said sensor assembly.

14. The sensor transportation apparatus as claimed in claim 1, wherein the elongate sensor assembly comprises a sampling tool oriented to take a sample and/or measurement from a high-side, a low side and/or a horizontal side of the wellbore with the sensor transportation apparatus in the most stable position.

15. A logging tool assembly comprising an elongate sensor assembly and a sensor transport apparatus as claimed in claim 1 for transporting the elongate sensor assembly through a wellbore, wherein the elongate sensor assembly comprises a sampling tool oriented to take a sample and/or measurement from a desired side of the wellbore when the pair of wheels are in contact with the wellbore wall with the apparatus in a single most stable position.

16. The logging tool assembly as claimed in claim 15, wherein the elongate sensor assembly comprises a said sampling tool oriented to take a sample and/or measurement from a high-side, a low-side, or a horizontal side of the wellbore.

* * * * *